United States Patent
Ohizumi et al.

(10) Patent No.: US 8,929,714 B2
(45) Date of Patent: Jan. 6, 2015

(54) INFORMATION REPRODUCING APPARATUS, METHOD FOR CONTROLLING INFORMATION REPRODUCING APPARATUS, CONTENT RECORDING MEDIUM, CONTROL PROGRAM, COMPUTER-READABLE RECORDING MEDIUM STORING CONTROL PROGRAM

(75) Inventors: Katsushi Ohizumi, Chiba (JP); Hideaki Kizuki, Chiba (JP); Jiro Kiyama, Funabashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 118 days.

(21) Appl. No.: 13/345,363

(22) Filed: Jan. 6, 2012

(65) Prior Publication Data

US 2012/0128329 A1    May 24, 2012

Related U.S. Application Data

(62) Division of application No. 10/560,542, filed as application No. PCT/JP2004/008106 on Jun. 10, 2004, now Pat. No. 8,285,115.

(30) Foreign Application Priority Data

Jun. 13, 2003 (JP) ................ 2003-169975
Dec. 24, 2003 (JP) ................ 2003-427032

(51) Int. Cl.
*H04N 9/80* (2006.01)

(52) U.S. Cl.
USPC .......................................... 386/248; 386/235

(58) Field of Classification Search
None
See application file for complete search history.

(56) References Cited

U.S. PATENT DOCUMENTS

| 5,712,949 | A  | 1/1998 | Kato |
| 5,923,627 | A  | 7/1999 | Miwa et al. |
| 6,404,418 | B1 | 6/2002 | Leem |
| 6,507,696 | B1 | 1/2003 | Chung et al. |

(Continued)

FOREIGN PATENT DOCUMENTS

| EP | 497252    | 8/1992  |
| JP | 02-285414 | 11/1990 |

(Continued)

OTHER PUBLICATIONS

U.S. Office Action dated Mar. 23, 2009 for U.S. Appl. No. 10/560,542.

(Continued)

*Primary Examiner* — William C Vaughn, Jr.
*Assistant Examiner* — Eileen Adams
(74) *Attorney, Agent, or Firm* — Edwards Wildman Palmer LLP; David G. Conlin; David A. Tucker

(57) ABSTRACT

The AV data reproducing apparatus includes: (i) a reading section for reading out, from a recording medium, additional function information indicating an additional function correlated with a manipulation input; and (ii) an additional function program executing section for executing the additional function in response to the manipulation input. With this, an operation unique to the content can be carried out by executing the additional function (additional function program) indicated by the additional function information stored in the recording medium together with the AV data. This makes it possible for the AV data reproducing apparatus to carry out an operation other than an operation intrinsically corresponding to a key.

3 Claims, 24 Drawing Sheets

(56) References Cited

U.S. PATENT DOCUMENTS

| | | | |
|---|---|---|---|
| 6,553,179 | B1 | 4/2003 | Miwa et al. |
| 6,614,844 | B1 | 9/2003 | Proehl |
| 7,469,410 | B2 | 12/2008 | Evans et al. |
| 7,595,846 | B2 | 9/2009 | Moon |
| 2003/0021593 | A1 | 1/2003 | Otsuka et al. |
| 2003/0086690 | A1 | 5/2003 | Chung et al. |
| 2003/0141415 | A1 | 7/2003 | Leclerc |
| 2003/0161615 | A1* | 8/2003 | Tsumagari et al. ............. 386/95 |
| 2003/0194212 | A1 | 10/2003 | Akita et al. |
| 2004/0047588 | A1 | 3/2004 | Okada et al. |
| 2004/0126096 | A1 | 7/2004 | Moon et al. |
| 2005/0188408 | A1 | 8/2005 | Wallis et al. |
| 2006/0143666 | A1 | 6/2006 | Okada et al. |
| 2007/0003220 | A1 | 1/2007 | Hamasaka et al. |
| 2007/0172207 | A1 | 7/2007 | Cho et al. |
| 2008/0282285 | A1 | 11/2008 | Thomas et al. |
| 2012/0128328 | A1* | 5/2012 | Ohizumi et al. ............. 386/248 |

FOREIGN PATENT DOCUMENTS

| | | |
|---|---|---|
| JP | 04-252464 | 9/1992 |
| JP | 07-271562 | 10/1995 |
| JP | 11-238367 | 8/1999 |
| JP | 11-312042 | 11/1999 |
| JP | 2001-052421 | 2/2001 |
| JP | 2002-007038 | 1/2002 |
| JP | 2002-044591 | 2/2002 |
| JP | 2002-244787 | 8/2002 |
| JP | 2002-251870 | 9/2002 |
| JP | 2002-290896 | 10/2002 |
| JP | 2002-313029 | 10/2002 |
| JP | 2002-313071 | 10/2002 |
| JP | 2003-219351 | 7/2003 |
| JP | 2003-281861 | 10/2003 |
| WO | WO 03/063467 | 7/2003 |

OTHER PUBLICATIONS

U.S. Office Action dated Sep. 18, 2009 for U.S. Appl. No. 10/560,542.
U.S. Office Action dated Jan. 12, 2010 for U.S. Appl. No. 10/560,542.
U.S. Office Action dated Jun. 14, 2010 for U.S. Appl. No. 10/560,542.
U.S. Office Action dated Sep. 23, 2011 for U.S. Appl. No. 10/560,542.
U.S. Office Action dated Jan. 12, 2012 for U.S. Appl. No. 10/560,542.
U.S. Office Action dated Jul. 3, 2013 for U.S. Appl. No. 13/345,325.
U.S. Office Action issued in U.S. Appl. No. 13/345,419 dated Nov. 27, 2013.
Notice of Allowance issued in U.S. Appl. No. 13/345,325 dated Dec. 9, 2013.
Advisory Action issued in U.S. Appl. No. 13/345,419 dated Jul. 14, 2014.
Office Action issued in U.S. Appl. No. 13/345,419 mailed Nov. 7, 2014.

* cited by examiner

FIG. 2

| SCENE | | MAIN FUNCTION | ADDITIONAL FUNCTION | |
|---|---|---|---|---|
| START POSITION (SECOND) | END POSITION (SECOND) | KEY CONTROL INFORMATION | KEY | ADDITIONAL FUNCTION PROGRAM |
| 0 | 49 | PAUSING IS DISAPPROVED | PAUSE KEY | MESSAGE m1 |
| 50 | 99 | FAST-FORWARDING IS DISAPPROVED | FAST-FORWARD KEY | MESSAGE m2 |
| | | | | |
| | | | | |
| | | | | |
| | | | | |
| | | | | |

22a: SCENE SPECIFYING INFORMATION
22b: KEY CONTROL INFORMATION
22c: ADDITIONAL FUNCTION INFORMATION
22: CORRELATION INFORMATION

FIG. 11

| SCENE | | MAIN FUNCTION | CORRELATED ICON | |
|---|---|---|---|---|
| START POSITION (SECOND) | END POSITION (SECOND) | KEY CONTROL INFORMATION | KEY | ICON DATA |
| 0 | 49 | PAUSING IS DISAPPROVED | PAUSE KEY | ICON i1 |
| 50 | 99 | FAST-FORWARDING IS DISAPPROVED | FAST-FORWARD KEY | ICON i2 |
| | | | | |
| | | | | |
| | | | | |
| | | | | |
| | | | | |
| | | | | |

222a: SCENE SPECIFYING INFORMATION
222b: KEY CONTROL INFORMATION
222c: ICON CORRELATION INFORMATION
222: CORRELATION INFORMATION

F I G. 1 3
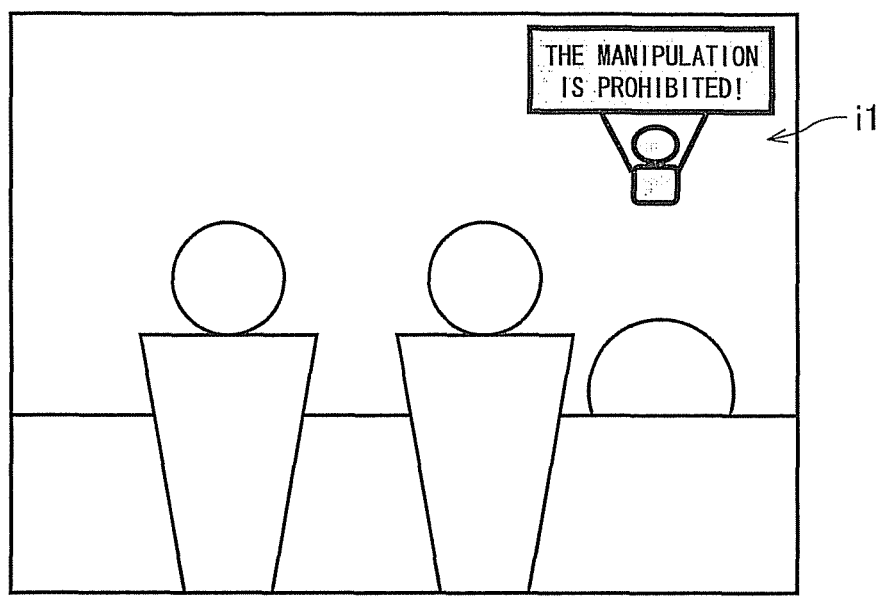

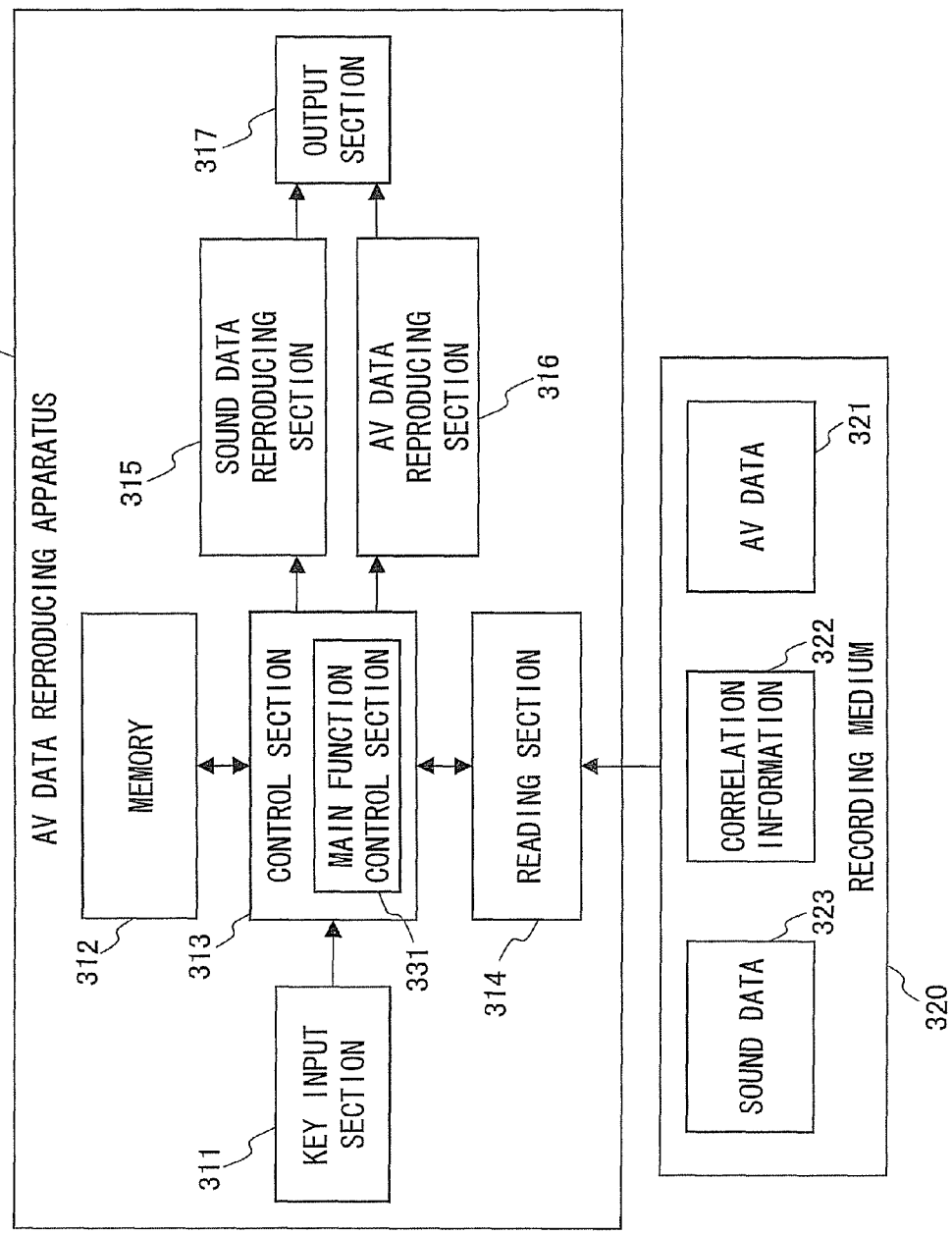

FIG. 15

| SCENE | | MAIN FUNCTION | CORRELATED SOUND | |
|---|---|---|---|---|
| START POSITION (SECOND) | END POSITION (SECOND) | KEY CONTROL INFORMATION | KEY | SOUND DATA |
| 0 | 49 | PAUSING IS DISAPPROVED | PAUSE KEY | SOUND a1 |
| 50 | 99 | FAST-FORWARDING IS DISAPPROVED | FAST-FORWARD KEY | SOUND a2 |
| | | | | |
| | | | | |
| | | | | |
| | | | | |
| | | | | |
| | | | | |

322a: SCENE SPECIFYING INFORMATION
322b: KEY CONTROL INFORMATION
322c: SOUND CORRELATION INFORMATION
322: CORRELATION INFORMATION

F I G. 2 3

| KEY | ADDITIONAL FUNCTION PROGRAM |
|---|---|
| PAUSE KEY | CM.class |
| FAST-FORWARD KEY | Animation1.class |
| FAST-BACKWARD KEY | Animation2.class |
| PLAY KEY | — |
| . . . | . . . |

1101:KEY CORRELATION TABLE

INFORMATION REPRODUCING APPARATUS, METHOD FOR CONTROLLING INFORMATION REPRODUCING APPARATUS, CONTENT RECORDING MEDIUM, CONTROL PROGRAM, COMPUTER-READABLE RECORDING MEDIUM STORING CONTROL PROGRAM

This Nonprovisional application is a Divisional application of prior copending U.S. patent application Ser. No. 10/560,542, filed on Dec. 13, 2005, entitled INFORMATION REPRODUCING APPARATUS, METHOD FOR CONTROLLING INFORMATION REPRODUCING APPARATUS, CONTENT RECORDING MEDIUM, CONTROL PROGRAM, COMPUTER-READABLE RECORDING MEDIUM STORING CONTROL PROGRAM by Katsushi Ohizumi, Hideaki Kizuki, and Jiro Kiyama (the same inventors as the inventors of this divisional application).

TECHNICAL FIELD

The present invention relates to (i) an information reproducing apparatus for reproducing image data and/or audio data each stored in a recording medium, (ii) a method for controlling the information reproducing apparatus, (iii) a content recording medium, (iv) a control program, and (v) a computer-readable recording medium storing the control program.

BACKGROUND ART

In recent years, a player capable of reproducing AV (audio-visual) data with ease has been pervasive. A specific example of such a player is a DVD player. A user inserts a disk in such a player, and can use a controller to send an instruction such as "play (reproduce)", "pause (suspend)", "fast-forward", or the like.

On the other hand, when preparing the AV data serving as a content, a preparer of the content can control (regulate) reproduction of the content. For example, the preparer can make such regulation that the user cannot carry out pausing manipulation (operation) or fast-forwarding manipulation while a specific scene is displayed. When the user sends such a prohibited instruction, the DVD player normally makes a warning sound or displays a warning indicating that the manipulation is prohibited.

Patent documents 1 and 2 below are documents each describing a prior technique to which the present invention pertains.

Described in Patent document 1 (Japanese Unexamined Patent Publication Tokukaihei 11-238367/1999 (published on Aug. 31, 1999)) is a usable key display system for notifying the user of which keys are manipulable at the moment among various manipulation keys. Specifically, the usable key display system uses an optical disk storing (i) reproduction control information PCI for controlling reproduction of stored data, and (ii) video object unit user operation control information VOBU_UOP_CTL contained in the PCI. Utilized for the notification are: (i) a step of extracting, from VOBU_UOP_CTL, a user manipulation bit group UOP for determining whether or not the manipulation is approved (authorized; permitted); and (ii) a step of notifying, when the user manipulation bit group UOP contains information of prohibiting the manipulation (UOP="1"), the user of keys whose manipulation is not prohibited by the user manipulation bit group UOP.

Meanwhile, described in Patent document 2 (Japanese Unexamined Patent Publication Tokukai 2002-290896 (published on Oct. 4, 2002)) is a recording medium reproducing apparatus allowing effective use of pausing time (suspended time). The following specifically explains this. That is, a DVD stores commercial image video data (CM video data) in, e.g., an angle region of a part of a multi-angle region. In response to press down of a pause button during reproduction of the DVD (reproduction of a main content of the content); the recording medium reproducing apparatus suspends the reproduction of the main content of the content, and causes a memory to store information indicative of the suspension position. In cases where the suspension position is in the multi-angle region, the CM video data starts to be reproduced from the suspension position. Meanwhile, in cases where the suspension position is not in the multi-angle region, the recording medium reproducing apparatus starts to reproduce CM video data positioned closest to the suspension position. The CM video data is reproduced from its beginning. Further, the reproduction of the video data of the main content is resumed from the suspension position indicated by the information stored in the memory, in response to press down of the pause button while the CM video data is reproduced, i.e., in response to an instruction of canceling the suspension.

However, when receiving the prohibited instruction from the user, the conventional structure merely makes the normal warning sound or displays the warning indicating that the manipulation is prohibited. This makes the user feel unpleasant. In other words, the indication using the warning sound and the warning display disturbs the viewing.

To solve the problem, the usable key display system described in Patent document 1 displays, on a screen or the like, a list of keys manipulable during reproduction of a content restricting the key input manipulation. The display on the screen is carried out prior to the reproduction of the content. After the reproduction starts, the list of the manipulable keys are sent to the remote controller. In accordance with the list thus sent, the remote controller causes the manipulable keys to light up. With this, the light-up of the manipulable keys of the remote controller allows the user to recognize which keys are manipulable in the currently reproduced content.

Reasons for prohibiting the manipulation are different among the contents; however, such indication described in Patent document 1 never clarifies the reasons even when used together with the warning sound and/or the warding display. Moreover, such indication is monotonous and insipid. Therefore, this is not effective to restrain the unpleasant feeling of the user.

Further, even in cases where the manipulation is approved, display indicative of the approved manipulation remains unvaried among the contents. This is insipid. Moreover, there is no freedom in changing functions and properties.

DISCLOSURE OF INVENTION

An object of the present invention is to provide (i) an information reproducing apparatus which can flexibly carry out control unique to a content in response to a manipulation input; (ii) a control method thereof; (iii) a content recording medium; (iv) a control program for realizing the information reproducing apparatus; and (v) a computer-readable recording medium storing the control program.

To achieve the object, an information reproducing apparatus of the present invention for controlling, in accordance with a manipulation input, reproduction of content data read out from a content recording medium, the information reproducing apparatus includes: (i) a reading section (additional function information reading means) for reading out, from the content recording medium, additional function information indicating an additional function correlated with the manipulation input; and (ii) an additional function executing section (additional function executing means) for executing the additional function in response to the manipulation input.

A method of the present invention for controlling, in accordance with a manipulation input, reproduction of content data read out from a content recording medium, the method includes the steps of: (a) reading out, from the content recording medium, additional function information indicating an additional function correlated with the manipulation input; and (b) executing the additional function in response to the manipulation input.

This makes it possible to execute a function different from the function intrinsically corresponding to the manipulation input. Further, the additional function information for specifying the additional function can be supplied together with the content data. This exhibits such an effect that the control unique to the content can be flexibly carried out in response to the manipulation input. Further, the content data and the additional function information can be supplied from the same content recording medium, so that data handling and medium handling are easy.

The additional function may be a function for executing an additional function program by which an arbitrary process can be carried out. Alternatively, the additional function may be a function for indicating image information, text information, audio information, or the like. The information to be indicated by way of such an additional function can be overlaid with the content data. In cases where the information to be indicated by way of the additional function is information concerning the content, the information concerning the content is indicated in response to the manipulation. This allows realization of, e.g., (i) a function for notifying, with the use of a voice of a protagonist of the content, the user that the manipulation done by the user is prohibited, and (ii) a function for carrying out blinking-display of an image which indicates the fast-forwarding, and which concerns the content. The notification is carried out in response to the manipulation input, and the blinking-display is carried out during the fast-forwarding.

Note that the information reproducing apparatus may be realized by a computer. In this case, the computer is caused to operate as each of the aforementioned means. For this reason, the present invention encompasses (i) a control program for realizing the functions of the information reproducing apparatus in the computer, and (ii) a computer-readable recording medium storing the control program.

As described above, the present invention makes it possible that the information reproducing apparatus for reproducing a medium storing a content such as a movie realizes, e.g., display of icon data stored in the medium. The display of the icon data is carried out in response to the manipulation done by the user while reproducing the content. For the realization of this, the manipulation and the type of icon data to be displayed are so managed as to be correlated with each other.

Meanwhile, Patent document 1 discloses the technique for causing the reproducing apparatus to display the valid manipulation in response to the manipulation carried out during the reproduction of the content. The present invention is different from Patent document 1 in that the display in Patent document 1 depends merely on the reproducing apparatus.

Further, Patent document 2 discloses the technique for reproducing the CM (commercial; advertisement) by switching the angles in response to the pausing manipulation. The present invention is different from Patent document 2 in that: in Patent document 2, no process is carried out in response to the fast-forwarding manipulation and/or the reproduction manipulation.

Additional objects, features, and strengths of the present invention will be made clear by the description below. Further, the advantages of the present invention will be evident from the following explanation in reference to the drawings.

BRIEF DESCRIPTION OF DRAWINGS

FIG. 2 is an explanatory diagram illustrating a specific example of correlation information stored in the recording medium shown in FIG. 1.

FIG. 11 is an explanatory diagram illustrating a specific example of correlation information stored in the recording medium shown in FIG. 10.

FIG. 13 is an explanatory diagram illustrating one example of screen display carried out by the AV data reproducing apparatus shown in FIG. 10.

FIG. 14 is a function block diagram schematically illustrating respective structures of an AV data reproducing apparatus and a recording medium each according to still another embodiment of the present invention.

FIG. 15 is an explanatory diagram illustrating a specific example of correlation information stored in the recording medium shown in FIG. 14.

FIG. 23 is an explanatory diagram illustrating one example of a key correlation table stored in the private data region shown in FIG. 22.

BEST MODE FOR CARRYING OUT THE INVENTION

Embodiment 1

One embodiment of the present invention will be described with reference to FIG. 1 through FIG. 9. Note that the present embodiment mainly explains a case where the present invention is applied to a DVD player; however, the present invention is not limited to the DVD player.

Figure 1:
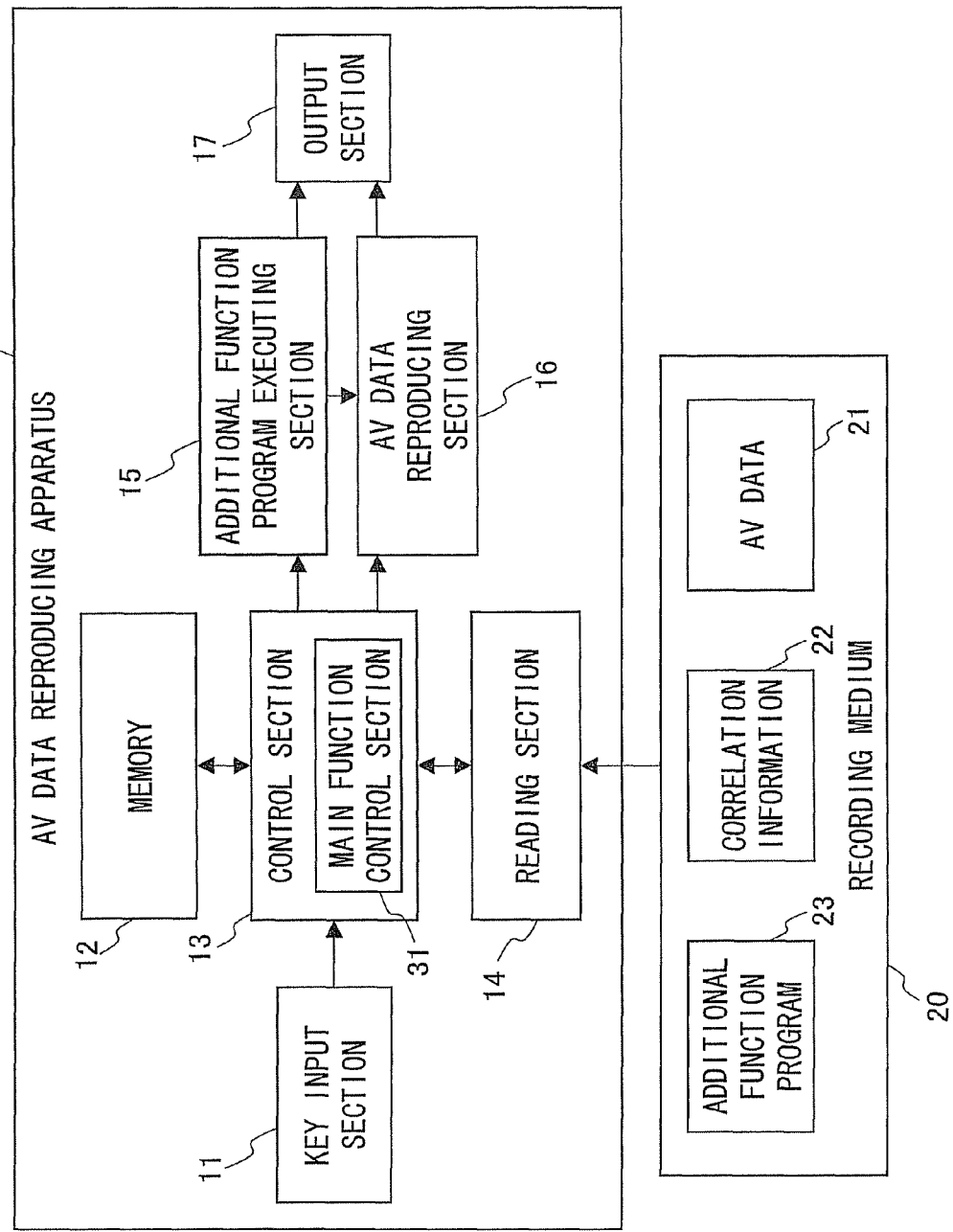
FIG. 1 is a function block diagram schematically illustrating respective structures of an AV data reproducing apparatus and a recording medium each according to one embodiment of the present invention.

FIG. 1 is a function block diagram schematically illustrating a structure of an AV data reproducing apparatus (information reproducing apparatus) 10 according to the present embodiment.

The AV data reproducing apparatus 10 carries out and controls reproduction of AV data (content data) 21 read out from a recording medium (content recording medium) 20. The control is carried out in accordance with a manipulation input. Therefore, the AV data reproducing apparatus 10 includes: a key input section 11, a memory 12, a control section 13, a reading section 14, an additional function program executing section 15, an AV data reproducing section 16, and an output section 17, as shown in FIG. 1.

The key input section 11 acquires the manipulation input sent to the AV data reproducing apparatus 10. Here, the wording "key" refers to a button provided in a manipulation panel or a remote controller. Examples of the button include: a "play button", a "stop button", a "pause button", a "fast-forward button", a "backward button", and the like. Further, the wording "manipulation input" refers to an input which is done as the result of the user's manipulation (operation) such as press down of the button, and which causes the AV data reproducing apparatus 10 to carry out the control. A specific example of the input is an input of instructing (i) start of the reproduction of the AV data, (ii) suspending thereof, or (iii) fast-forwarding thereof. Note that, the AV data reproducing apparatus 10 may be provided with (i) the aforementioned standard keys, and (ii) a special key such as "a reproduction direction change key", "a reproduction speed change key", or the like. By pressing such a special key, the user can send an instruction corresponding to the function assigned to the special key.

The memory 12 temporarily stores information to be processed by the control section 13. A specific example of the information is correlation information 22 described later.

The control section 13 receives the manipulation input from the key input section 11, and sends control information to the memory 12, the reading section 14, the additional function program executing section 15, and the AV data reproducing section 16. Further, the control section 13 includes a main function control section (main function control means) 31 for carrying out control of the operation to be carried out in response to the manipulation input. The control is carried out in accordance with key control information (main function control information) 22b described later. Note that the control section 13 can cause the memory 12 to store, at an arbitrary timing, information stored in the recording medium 20.

When the reading section (additional function information reading means; additional function program reading means; main function control information reading means) 14 receives, from the control section 13, an instruction of reading out the information from the recording medium 20, the reading section 14 reads out the information therefrom in accordance with the instruction (readout instruction). Specifically, the reading section 14 reads out the AV data 21, the correlation information 22, and additional function programs 23, from the recording medium 20. Note that the number of media that can be controlled by the reading section 14 is not limited to one. Note also that the type of medium that can be controlled by the reading section 14 is not limited to one type.

The AV data reproducing section 16 receives, from the control section 13, an instruction of reproducing the AV data stored in the recording medium 20. Upon the reception, the AV data reproducing section 13 converts (i) the AV data 21 read out by the reading section 14 from the recording medium 20, into (ii) data compliant with an AV output format. Then, the AV data reproducing section 16 sends the data to the output section 17.

The additional function program executing section (additional function executing means) 15 executes each of the additional function programs 23 so as to execute the additional function corresponding to the manipulation input. Specifically, the additional function program executing section 15 receives, from the control section 13, an instruction of executing the additional function program, and sends the instruction to the AV data reproducing section 16. Moreover, the additional function program executing section 15 sends, to the output section 17, an AV output obtained by executing the additional function program. Especially, the additional function program executing section 15 indicates (by way of image display and/or audio output) information such as a message so that the information is overlaid with the AV data 21 currently reproduced.

The output section 17 supplies (i) the AV outputs sent respectively from the AV data reproducing section 16 and the additional function program executing section 15, to (ii) an AV output apparatus (not shown) connected to the AV data reproducing apparatus 10. The output section 17 is a component output apparatus connected to, e.g., a television or the like. Alternatively, the output section 17 may be an output apparatus such as a television.

Next, the recording medium 20 is an external recording medium such as DVD-ROM. The AV data 21, the correlation information 22, and the additional function program 23 are stored in the recording medium 20 such that they can be supplied, to the AV data reproducing apparatus 10. Note that the number of the recording medium 20 is not limited to one, and the information may be continuously stored in a plurality of media.

The AV data 21 is AV data of a content stored in the recording medium 20. A specific example of the content is a movie.

Set in the correlation information 22 is at least correlation between each of the keys and the additional function program 23. The correlation information 22 is loaded in the memory 12 as required. In reference to the correlation information 22, the control section 13 invokes (calls up) an additional function program 23 corresponding to key manipulation.

Each of the additional function programs 23 is invoked by the control section 13 as such, and is executed by the additional function program executing section 15.

Explained here is the correlation information 22, with reference to FIG. 2. FIG. 2 is an explanatory diagram illustrating a specific example of the correlation information 22. In FIG. 2, the key setting of the key control information 22b coincides with the key setting of the additional function information 22c; however, the key setting of the key control information 22b may be different form the key setting of the additional function information 22c. Alternatively, the key setting may be done in either the key control information 22b or the additional function information, 22c.

See FIG. 2. In the correlation information 22, each of the key control information 22b and the additional function information 22c is so set as to be correlated with scene specifying information 22a.

Set in the scene specifying information 22a are: (i) the start position of each scene of the content, and (ii) the end position thereof. The scene specifying information 22a may be an index other than the reproduction time; as long as the scene specifying information 22a specifies the scene of the AV data 21. A specific example of the index is the number of bytes, which number is counted from a head. Alternatively, items of the correlation information are prepared such that: the items respectively correspond to the scenes of the AV data 21, and are respectively multiplexed with the scenes. With this, each of the scenes can be specified. In this case, the correlation information 22 does not include the scene specifying information 22a, i.e., merely includes the key control information 22b and the additional function information 22c. A specific case where the correlation information 22 does not include the scene specifying information 22a is a case where the AV data 21 is in compliance with a data format such as the DVD format. This will be explained later.

The key control information (main function control information) 22b indicates whether or not execution of each main function is approved: The main function is an intrinsic function corresponding to a manipulation input. In other words, the key control information 22b is information for controlling the function assigned to the key manipulated by the user. For example, when the key control information 22b indicates that the pausing is disapproved, the main function control section 31 disables the input of the pause key. The target of this setting is not limited to one key, and a plurality of key control information items can be set simultaneously. For, example, flags indicative of whether functions are enabled or disabled may be set to all the keys, respectively. Note that, in cases where the function of prohibiting the processing is not required, the correlation information 22 does not include the key control information 22b.

Set in the additional function information 22c is correlation between (i) the key corresponding to the manipulation input, and (ii) the additional function program 23.

So, see an example in which the AV data reproducing apparatus 10 reads out the correlation information 22 shown in FIG. 2, and in which the key input section 11 detects that the pause key is manipulated during reproduction of the scene corresponding to a period of time from 0 second to 49 seconds. In response to the detection, the main function control section 31 disables and cancels the key manipulation, and the reading section 14 reads out a specified additional function program 23, i.e., a "program of displaying message m1", from the recording medium 20, and the additional function program executing section 15 executes the specified additional function program 23 thus read out. In the above example, the key targeted for the setting is a key whose manipulation is "disapproved"; however, the present invention is not limited to this, and the target key may be a key whose manipulation is "approved". Further, as is the case with the key control information 22b, the key targeted for the setting is not limited to one key, and a plurality of key control information items can be set simultaneously. Further, the key specified by the additional function information 22c does not need to correspond to the key specified by the key control information 22b. Further, the additional function program 23 corresponding to the key manipulation may be loaded in advance in the memory 12.

Note that the correlation information 22 and the recording format thereof can be arbitrarily changed according to the data format of a content to be recorded. For example, the AV data 21 recorded in compliance with the DVD standard data structure is sectioned based on unit time, so that the key control information 22b is set based on the unit time and the additional function information 22c can be recorded based on the unit time. In other words, in cases where the recording medium 20 is a DVD-ROM, the AV data 21 and the correlation information 22 are so structured as to correspond to each other. This makes it possible that the correlation information 22 does not include the scene specifying information 22a.

Figure 3:
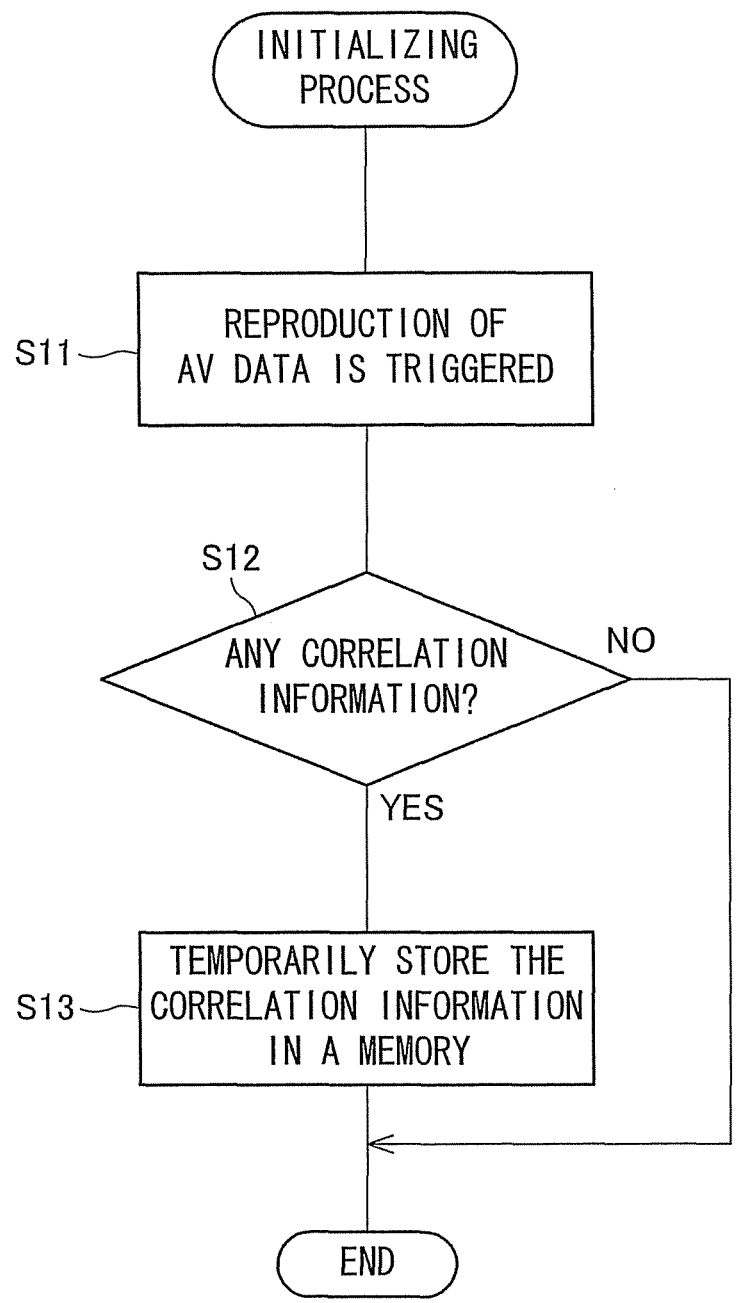
FIG. 3 is a flowchart illustrating procedure of an initializing process of the AV data reproducing apparatus shown in FIG. 1.

Explained next is an initializing process carried out before the AV data reproducing apparatus 10 reproduces the AV data 21, with reference to FIG. 3. FIG. 3 is a flowchart illustrating the initializing process in the AV data reproducing apparatus 10.

Firstly, when the reproduction of the AV data is triggered by, e.g., inserting the recording medium 20, the control section 13 accesses the recording medium 20 via the reading section 14 (S11).

Next, the control section 13 checks whether or not the correlation information 22 is stored in the recording Medium 20 (S12). In cases where the correlation information 22 is stored therein (YES in S12), the control section 13 causes the memory 12 to store the correlation information 22 read out from the recording medium 20 by the reading section 14 (S13 (additional function information reading step)), and then the initializing process is terminated. On the other hand, in cases where no correlation information 22 is stored in the recording medium 20 (NO in S12), the initializing process is terminated.

Figure 4:
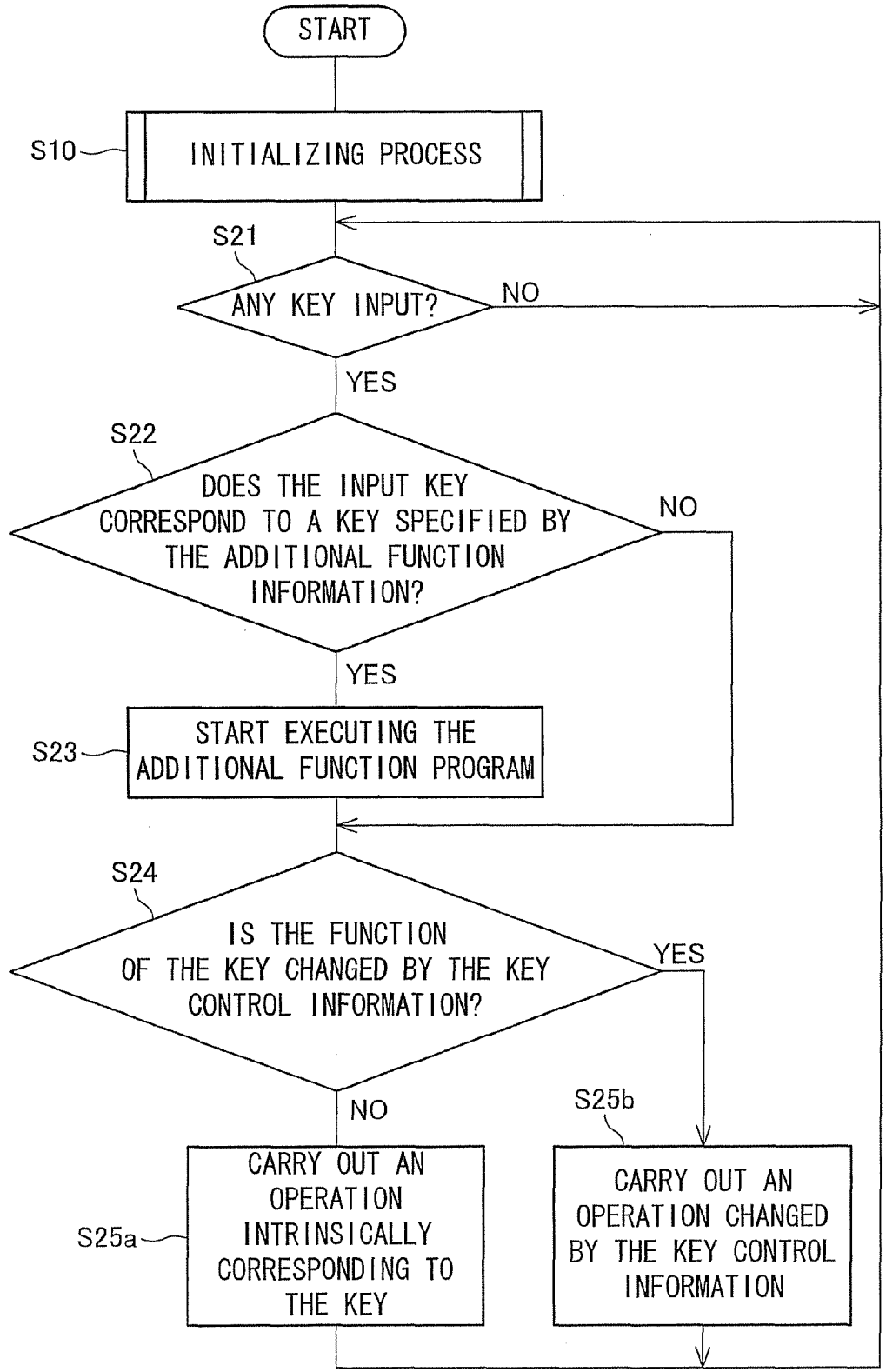
FIG. 4 is a flowchart illustrating procedure of a process carried out while the AV data reproducing apparatus shown in FIG. 1 reproduces AV data.

The following explains control carried out while the AV data reproducing apparatus 10 reproduces the AV data 21, with reference to FIG. 4. FIG. 4 is a flowchart illustrating the control carried out while the AV data reproducing apparatus 10 reproduces the AV data.

Firstly, the control section 13 carries out the aforementioned initializing process (S11 through S13) when starting the reproduction (S10).

Next, the control section 13 checks the key input section 11, i.e., checks whether or not the user has manipulated any key (S21). In cases where no key manipulation was carried out (NO in S21), the sequence goes back to the step S21.

On the other hand, in cases where the key manipulation input was carried out (YES in S21), the control section 13 judges whether or not the key manipulated by the user corresponds to the key (specified key) specified by the additional function information 22c of the correlation information 22 temporarily stored in the memory 12 (S22). In cases where the key manipulated by the user is so judged as to correspond to the specified key (YES in S22), the control section 13 reads out, from the recording medium 20 via the reading section 14, the additional function program 23 corresponding to the key manipulation input done in S21. The additional function program 23 thus read but is sent to the additional function program executing section 15. The additional function program executing section 15 starts to execute the received additional function program 23, in accordance with the control information sent from the control section 13 (S23 (additional function executing step)). Note that the additional function program 23 may be read in advance.

Next, the main function control section 31 of the control section 13 judges whether or not the key manipulated by the user is a key whose function is changed according to the key control information 22b of the correlation information 22 stored temporarily in the memory 12, i.e., judges whether or not the intrinsic operation corresponding to the key is, approved (S24). In cases where the function of the key is so judged as to be unchanged (NO in S24), the main function control section 31 carries out the intrinsic operation corresponding to the key (S25a). On the other hand, in cases where the function of the key is so judged as to be changed (YES in S24), the main function control section 31 carries out the operation specified by the key control information 22b (S25b). After each of the steps S25a and S25b, the control section 13 waits for a next key input, i.e., the sequence goes back to S21.

For example, while the AV data reproducing apparatus 10 having read out the correlation information 22 shown in FIG. 2 reproduces the scene corresponding to the period of time from 0 second to 49 seconds, the main function control section 31 executes the intrinsic functions assigned to keys other than the pause key, in response to manipulation of the keys. On the other hand, the following operations (1) and (2) are carried out in cases where the pause key is manipulated during the reproduction of the scene: (1) the additional function program executing section 15 executes the additional function program 23 (for displaying the message m1) with which the additional function information 22c correlates the pause key (S23); and (2) the main function control section 31 carries out no operation because the manipulation of the key is "disapproved" by the key control information 22b (S25b).

Note that the order of executing (i) the process (S22 and S23) concerning the main function, and (ii) the process (S24 and S25) concerning the additional function may be reverse to the order described in the above example. Note also that the correlation information 22 is not necessarily required to be temporarily stored in the memory 12, and may be read out from the recording medium 20 as required.

The following explains specific examples of the additional function programs 23 with reference to FIG. 5 through FIG. 9. Each of FIG. 5 through FIG. 9 describes an example of an image displayed on a screen of the output section 17 when each of the additional function programs 23 is executed by the AV data reproducing apparatus 10. Note that key manipulation described in each of the specific examples below is just an explanatory example, so that the present invention is applicable to any key that can be manipulated by the user for the purpose of sending an instruction to the key input section 11 of the AV data reproducing apparatus 10. Further, ways of indicating warning or the like to the user are not limited to the specific example, as long as the indication is realized in the output section 17 by way of the additional function program 23 that can be executed by the additional function program executing section 15.

(1) An additional function program for notifying, in response to a manipulation input prohibited in a scene, that the manipulation input is prohibited.

Figure 5:
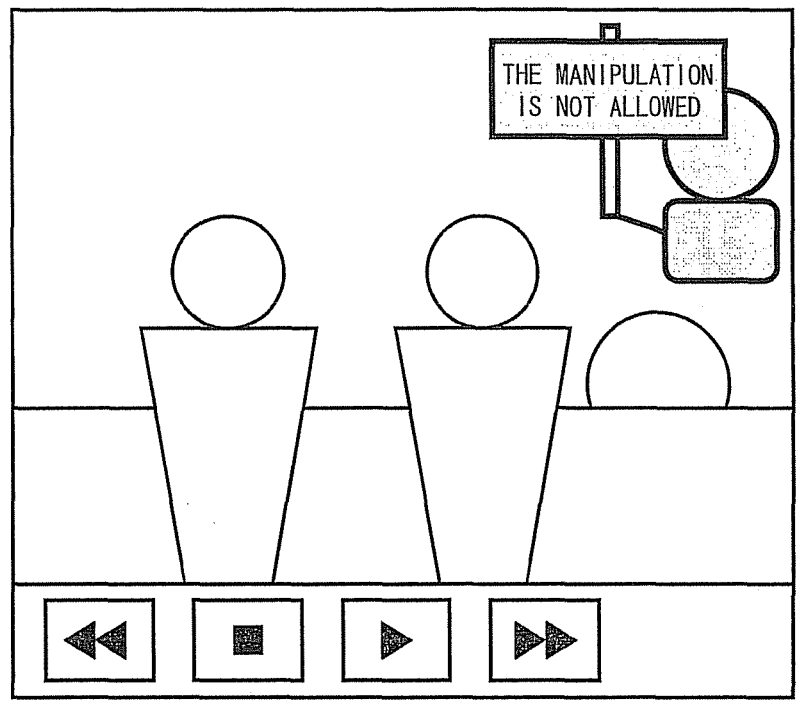
FIG. 5 is an explanatory diagram illustrating one example of screen display carried out by the AV data reproducing apparatus shown in FIG. 1.

See FIG. 5, for example. In a scene prohibiting the manipulation (pausing manipulation) of suspending the reproduction, the additional function program 23 correlated with the pause key causes display of a moving image on the screen such that the moving image is superimposed on a part of the display of the AV data 21. The moving image is an image of a protagonist of a movie contained in the AV data 21, and notifies the user that the manipulation is prohibited. It is preferable that the normal warning sound and the normal warning display be restrained. As such, the indication does not merely use the warning sound or the warning display. This allows the user to feel less unpleasant even when such warning is made in response to the key manipulation prohibited in the scene.

Figure 6:
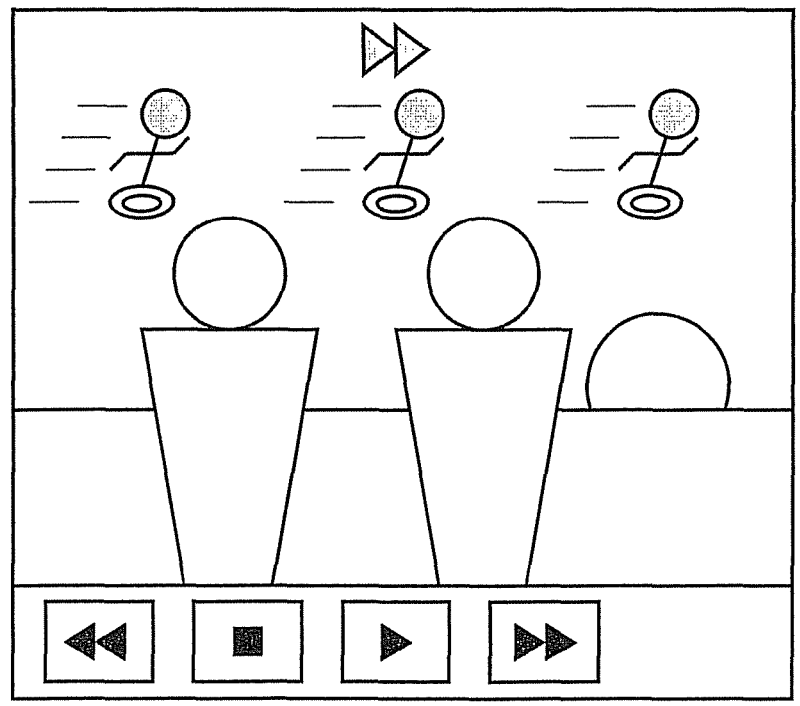
FIG. 6 is an explanatory diagram illustrating another example of the screen display carried out by the AV data reproducing apparatus shown in FIG. 1.

(2) An additional function program for reproducing animation in synchronism with fast-forwarding of the AV data, in response to a manipulation input of the fast forwarding See FIG. 6, for example. The additional function program 23 correlated with the fast-forward key causes display of an animation on the screen such that the animation is superimposed on a part of the display of the AV data 21. The animation is such an animation that a character of the movie contained in the AV data 21 runs. Further, the running speed of the character may be changed according to speed of the fast forwarding. With this, the user can enjoy visually even when the user manipulates the AV data reproducing apparatus 10 so as to control the reproduction of the AV data 21.

Figure 7:
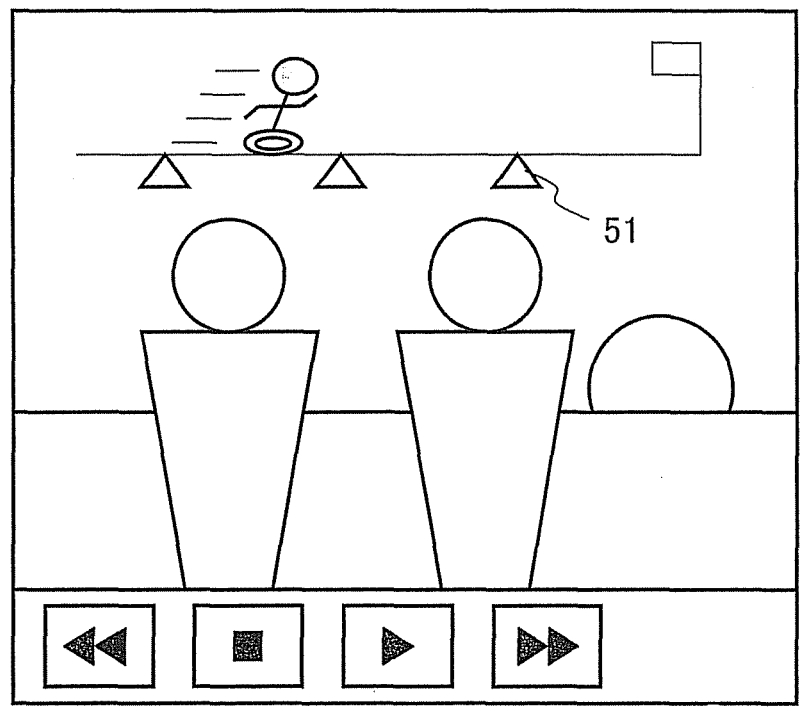
FIG. 7 is an explanatory diagram illustrating still another example of the screen display carried out by the AV data reproducing apparatus shown in FIG. 1.

(3) An additional function program for using a character of the content so as to indicate a reproduction position in synchronism with the fast-forwarding operation of the AV data, which fast-forwarding operation is carried out in response to an manipulation input for the fast-forwarding operation See FIG. 7, for example. The additional function program 23 correlated with the fast-forward key causes display of an image of a current reproduction position of the AV data. Specifically, displayed is such an animation that a character of the movie contained in the AV data 21 runs on, e.g., a straight line scale corresponding to entire recording time of the AV data 21. In this case, the manipulation of the fast-forward key is approved during the reproduction of the AV data 21 by the correlation information 22.

Accordingly, the AV data reproducing apparatus 10 makes it possible to notify the reproduction position with the use of the character of the content while carrying out the fast-forwarding of the AV data 21. With this, the user can enjoy visually even when the user manipulates the AV data reproducing apparatus 10 so as to control the reproduction of the AV data 21.

Further, as shown in FIG. 7, the AV data reproducing apparatus 10 displays a position mark 51 for, e.g., every scene of the content or every chapter thereof. The user can select the position mark 51 so as to start reproduction from the scene or chapter each corresponding to the position mark 51. Note that a position of displaying the position mark 51 can be acquired in accordance with management information contained in either the scene specifying information 22a or the AV data 21.

Figure 8:
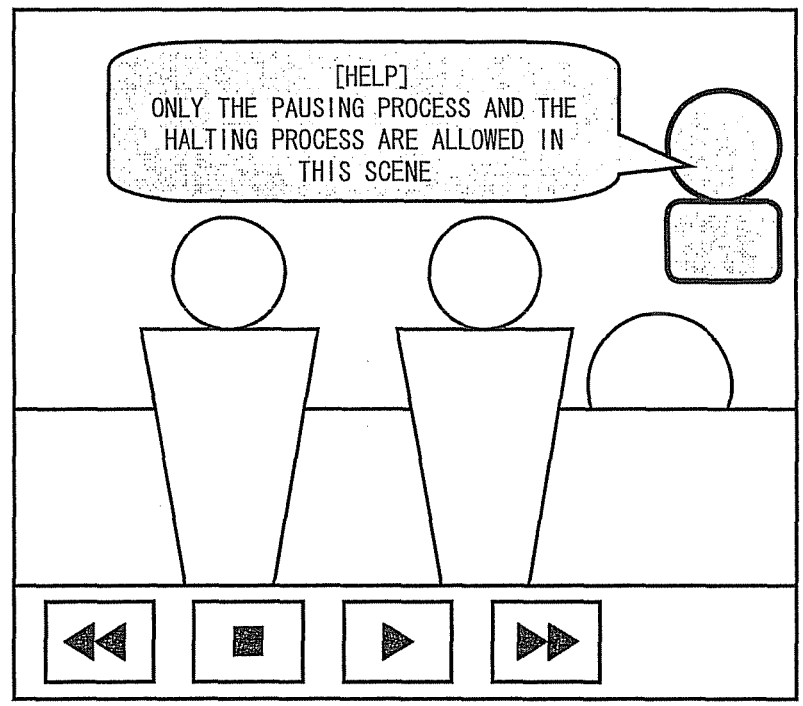
FIG. 8 is an explanatory diagram illustrating yet another example of the screen display carried out by the AV data reproducing apparatus shown in FIG. 1.

(4) An additional function program for displaying HELP indication in response to a manipulation input prohibited in a scene See FIG. 8, for example. The additional function program 23 correlated with each key whose manipulation is set to be prohibited causes display of a still image on the screen such that the still image is superimposed on a part of the display of the AV data 21. The still image is an image of an animation character of the AV data 21, and notifies the user of which keys are manipulable. This makes it possible for the user to recognize the manipulable keys with ease. Further, such easily understandable notification allows even a child or the like to recognize which keys are manipulable.

Figure 9:
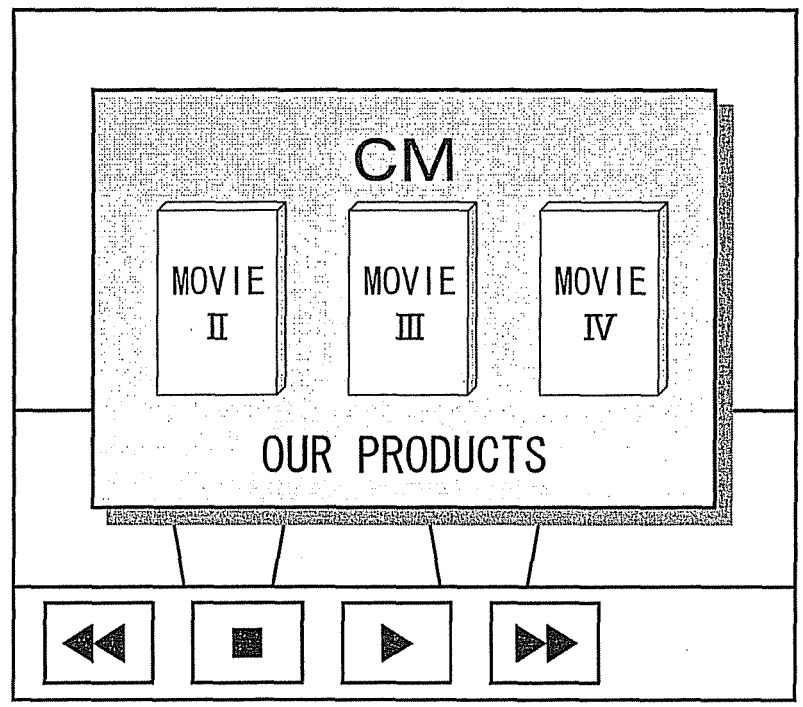
FIG. 9 is an explanatory diagram illustrating still another example of the screen display carried out by the AV data reproducing apparatus shown in FIG. 1.

(5) An additional function program for reproducing CM images at random in response to the pausing manipulation input See FIG. 9, for example. The additional function program 23 correlated with the pause key causes random reproduction of the CM images. This causes the user to have more opportunities of viewing different CM data. Note that, when the pause key is pressed again during the reproduction of the CM image, the additional function program 23 may cause the normal pausing processing to be carried out, i.e., may cause display of the still image of the currently reproduced image.

Here, see a case where a plurality of users view one AV data together with the use of a general AV data reproducing apparatus such as a DVD player. When a part of the users leave temporarily, the other users suspend the reproduction of the AV data, and wait for them to come back. On this occasion, as described in Patent document 2, the AV data reproducing apparatus possibly reproduces the CM data which is stored in a multi-angle track of the DVD, and which is positioned in the vicinity of the reproduction position of the content whose reproduction is currently suspended. However, the CM data to be reproduced depends on the reproduction position of the currently reproduced content, so that CM data to be reproduced cannot be selected. Therefore, in cases where the suspending is carried out several times in positions close to each other, only the same CM data is reproduced.

As described above, the key control information 22b correlates the additional function program 23 with the manipulation input of the key whose intrinsic function (main function) is disapproved to be executed. With this, the additional function program 23 can have the function of notifying the information concerning the disapproval of the execution of the function corresponding to the manipulation input. Examples of such a function include: (i) the function of notifying the information representing that the manipulation input is prohibited, and (ii) the function of notifying the information representing which manipulation inputs are approved.

Further, the function of indicating the information different from the currently reproduced AV data 21 can be given to the additional function program 23 thus correlated with the manipulation input, in the following case (1) or (2): (1) a case where the manipulation input corresponds to either (i) the manipulation of suspending the reproduction of the AV data 21, or (ii) manipulation of halting the reproduction thereof; or (2) a case where the manipulation input corresponds to the manipulation of changing either (i) the reproduction direction of the AV data 21, or (ii) the reproduction speed thereof.

Note that the present embodiment assumes the case where the additional function program 23 is stored in the recording medium 20; however, the additional function program 23 may be stored in the AV data reproducing apparatus 10. Alternatively, the additional function program may be stored in a recording medium other than the recording medium 20, and be supplied to the AV data reproducing apparatus 10. The additional function program thus supplied is executed when the AV data 21 of the recording medium 20 is reproduced.

Here, the main function and the additional function are explained more in details. As described above, the use of the additional function program 23 makes it possible for the AV data reproducing apparatus 10 to execute the intrinsic function (main function) and the other function in response to the key input. Further, in accordance with the key control information 22b, the main function can be disabled, i.e., the main function is not executed but only the additional function is executed. Further, the AV data reproducing apparatus 10 can be arranged such that: the intrinsic functions are not respectively assigned to the keys, but all the functions are realized in accordance with the additional function program 23. Note that the intrinsic functions of the AV data apparatus 10 can be replaced with functions specified by the key control information 22b. The wording "intrinsic function" refers to such a function that is executable irrespective of the additional function program 23.

Further, each of the functions realized in the AV data reproducing apparatus 10 by the additional function program 23 may be either (i) a function relevant to each of the intrinsic functions respectively assigned to the keys, or (ii) a function irrelevant thereto.

Further, the additional function program 23 can be read out from the recording medium 20. Alternatively, the additional function program 23 may be stored in advance in the AV data reproducing apparatus 10, or may be acquired from another recording medium or an external apparatus. Alternatively, a plurality of additional function programs 23 may be supplied from different sources, and the additional programs 23 thus supplied may be executed in combination in accordance with the correlation information 22 when reproducing AV data 21 of one recording medium 20.

The following explains a case of enhancing the function of the fast-forward key. This is one example of enhancing the intrinsic function given to a key. Therefore, the key targeted for such enhancing, and the manipulation targeted therefor are not limited to this example. The enhancing can be applied to any manipulation that can be done by user for the purpose of giving an instruction to the AV data reproducing apparatus 10.

In response to press down of the fast-forward key during reproduction of AV data, a general AV data reproducing apparatus carries out fast-forwarding reproduction of the AV data until another press down of a manipulation key is carried out.

In such a case, the function of the fast-forward key can be enhanced in the AV data reproducing apparatus 10 so as to cause the user to view a scene that the content preparer really wants the user to view, even when the fast-forwarding reproduction is carried out. Specifically, the fast-forward key is correlated with such an additional function program 23 that causes the AV data reproducing apparatus 10 to carry out (i) fast-forwarding until a position designated by the content preparer comes, and (ii) normal reproduction from the position. During the reproduction of such a scene of the AV data, the manipulation of the fast-forward key is prohibited. Accordingly, even when the fast-forwarding reproduction of the AV data is carried out in response to the press down of the fast-forward key during the reproduction of the AV data, the AV data can be caused to be normally reproduced from the position designated by the content preparer.

The following explains a case where another function executable during the reproduction is assigned to the reproduction key. This is one example of realizing a function irrelevant to an intrinsic function assigned to a key. Therefore, the key targeted for such irrelevant function assigning, and the manipulation targeted therefor are not limited to this example. The irrelevant function assigning can be applied to any manipulation that can be done by user for the purpose of giving an instruction to the AV data reproducing apparatus 10.

Generally, there is a content prohibiting specific manipulation based on scenes. For example, the manipulation of the reproduction key is prohibited while a scene of the content is reproduced.

In light of this, during the reproduction of such a scene of the content, the reproduction key is correlated with, e.g., an additional function program 23 for renewing a displayed subtitle by specifying a subtitle track. Specifically, the manipulation of the reproduction key is prohibited during the reproduction of such AV data; however, when the reproduction key is pressed one more time, the displayed subtitle can be renewed.

Alternatively, during the reproduction of such a scene, the reproduction key is correlated with, e.g., an additional function program 23 for outputting a subtitle of Japanese Hiragana characters (or different expression, or different translation). By pressing such a reproduction key when viewing the AV data having a subtitle, the subtitle is turned into Hiragana characters (or different expression, or different translation). This is good for a user who has too bad eyesight to recognize a subtitle including Japanese Kanji characters (or display including a complex character or a complex letter), and who feels that characters or letters in the subtitle are too complicated to be legible.

As described above, the AV data reproducing apparatus 10 is an apparatus for reproducing AV data contained in a DVD or the like, and has the function of executing the previously set additional function program in response to the manipulation input sent from either the manipulation panel or the remote controller. By executing such an additional function program stored together with the AV data in the content recording medium, the AV data reproducing apparatus 10 can carry out the specific operation corresponding to the recording medium, i.e., can carry out the operation corresponding to the content. This makes it possible that the key manipulation input causes the AV data reproducing apparatus 10 to operate to execute the function other than the intrinsic function of the key. In other words, this exhibits the effect other than the effect obtained by carrying out the specific key manipulation.

For example, when the user carries out key manipulation in a scene in which the manipulation is so designated as to be prohibited, the AV data reproducing apparatus 10 can notify the user that the manipulation is prohibited, by using not only a mere warning sound and warning display but also an image of a protagonist of a movie stored, in the recording medium. Such notification uses not only the warning sound and the warning display, so that the user feels less unpleasant even when such warning is notified in response to the manipulation prohibited in the scene. In contrast, only the warning sound and the warning display have been conventionally used to notify that the user's instruction is prohibited during the reproduction. Such notification using only the warning sound and the warning display makes the user feel unpleasant. The prohibition of the instruction is designated by the control (regulation) carried out over the reproduction manipulation of the content contained in a DVD, etc., which allows for such a control. The control is carried out upon the content preparation.

Further, the AV data reproducing apparatus 10 makes it possible for the user to visually enjoy even when the user carries out the AV data manipulation such as the fast-forwarding reproduction or the fast-backwarding reproduction.

Further, the AV data reproducing apparatus 10 makes it possible for the user to easily recognize which keys are manipulable, even in cases where, e.g., the user is a child.

Further, the AV data reproducing apparatus 10 makes it possible for the user to have more opportunities of viewing different CM data. Further, while reproducing the CM data, the additional function program is activated, so that the additional function program can be programmed such that: by pressing the pause key one more time, a normal pausing process (suspension process) is carried out, i.e., a still image of a currently reproduced image is displayed.

Note that the present embodiment never limits the scope of the present invention, and can be varied within the scope of the present invention. For example, the present embodiment can be arranged as follows.

An AV data reproducing method (method for controlling an information recording apparatus) of the present invention includes the steps of: (A) receiving manipulation; and (B) controlling an AV data reproducing function intrinsically corresponding to the manipulation. The AV data reproducing method may further includes the steps of: (C) reading out, from a recording medium, correlation information of (i) the manipulation and (ii) an additional function program to be executed in response to the manipulation; and (D) controlling execution of the additional function program in accordance with the correlation information.

The AV data reproducing method may further include the step of (E) reading out the additional function program from the recording medium.

Further, the AV data reproducing method may be arranged such that: the manipulation for controlling the intrinsic AV data reproducing function is prohibited by the correlation information, and an additional function program corresponding to the prohibited manipulation is an additional function program for indicating, to the user, information concerning the prohibited manipulation.

Further, the AV data reproducing method may be arranged such that the information concerning the prohibited manipulation is information indicative of a manipulable key.

Further, the AV data reproducing method may be arranged such that: the manipulation is either (i) manipulation of suspending the reproduction of the AV data, or (ii) manipulation of halting the reproduction thereof, and the additional function program is a program for indicating information different from the AV data.

Further, the AV data reproducing method may be arranged such that: the manipulation is manipulation of changing at least either (i) a reproduction direction of the AV data, or (ii) reproduction speed thereof, and the additional function program is a program for indicating information different from the AV data.

Further, the AV data reproducing method may be arranged such that the information indicated by way of the additional function program is overlaid with the AV data.

Further, an AV data reproducing apparatus (information reproducing apparatus) of the present invention includes: (i) an input section for receiving manipulation; and (ii) an AV data reproducing section for realizing an AV data reproducing function intrinsically corresponding to the manipulation. The AV data reproducing apparatus may includes: (a) a reading section for reading out, from a recording medium, correlation information of (i) the manipulation and (ii) an additional function program to be executed in response to the manipulation; and (b) an additional function program executing section for executing the additional function program in accordance with the correlation information.

Further, an AV data recording medium (content recording medium) of the present invention is a recording medium for storing the AV data, and may store the correlation information of (i) the manipulation described in the aforesaid AV data reproducing method and (ii) the additional function program to be executed in response to the manipulation.

Embodiment 2

Another embodiment of the present invention will be described below with reference to FIG. 10 through FIG. 13. Note that the structure of the present embodiment is basically the same as the structure of Embodiment 1, so that each of members corresponding to the members of Embodiment 1 is given a reference numeral obtained by giving a numeral "2" in front of each of the reference numerals of the members of Embodiment 1. Further, the wordings defined in Embodiment 1 are used in the same manner in the present embodiment, unless otherwise noted.

While reproducing AV data, an AV data reproducing apparatus (information reproducing apparatus) 210 according to the present embodiment displays an icon concerning the currently reproduced AV data. The display is carried out in response to key input manipulation. Here, the wording "icon" refers to either a small picture or a symbol each indicating certain information. Note that the present embodiment is applicable to any image information including the icon, a moving image, and a still image.

Specifically speaking, the structure of the AV data reproducing apparatus 210 is obtained by replacing (i) the additional function program executing section 15 of the AV data reproducing apparatus 10 described in Embodiment 1 and shown in FIG. 1, with (ii) an icon display section (additional function executing means; image information displaying means) 215. That is, the AV data reproducing apparatus 10 executes the additional function program in response to the key input, while reproducing the AV data. On the other hand, while reproducing the AV data, the AV data reproducing apparatus 210 displays the icon in response to the key input.

Figure 10:
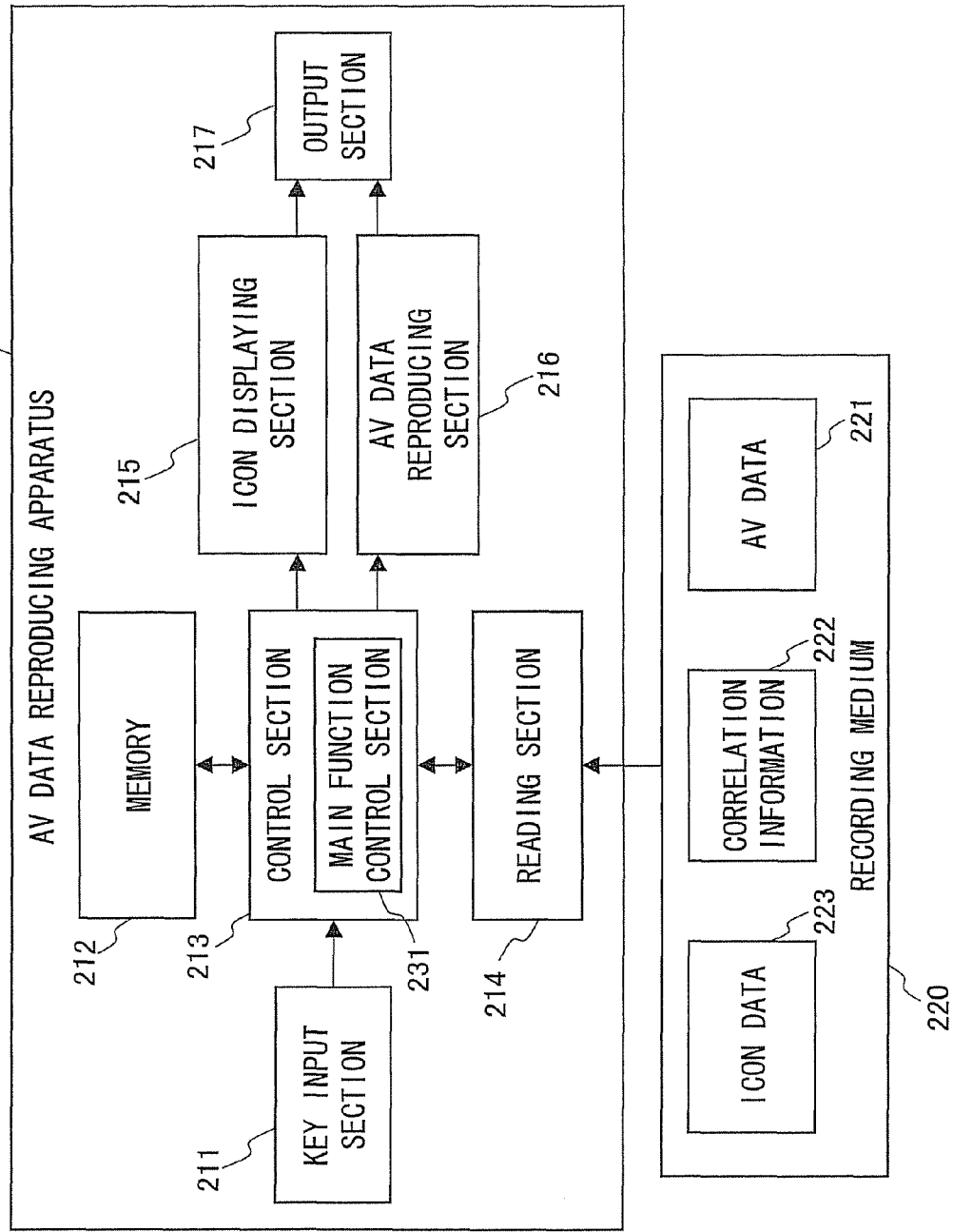
FIG. 10 is a function block diagram schematically illustrating respective structures of an AV data reproducing apparatus and a recording medium each according to another embodiment of the present invention.

FIG. 10 is a function block diagram schematically illustrating the structure of the AV data reproducing apparatus 210. The AV data reproducing apparatus 210 carries out and controls reproduction of AV data (content data) 221 read out from a recording medium (content recording medium) 220. The control is carried out in accordance with the manipulation input. Therefore, the AV data reproducing apparatus 210 includes: a key input section 211, a memory 212, a control section 213, a reading section (image information reading means; text information reading means) 214, an icon displaying section 215, an AV data reproducing section 216, and an output section 217, as shown in FIG. 10.

The key input section 211 acquires the manipulation input sent to the AV data reproducing apparatus 210. Here, the wording "key" refers to a button, etc., provided in either a manipulation panel of the AV data reproducing apparatus 210 or a remote controller thereof. Examples of the button include: a "play button", a "stop button", a "pause button", a "fast-forward button", a "backward button", and the like. Further, the wording "the manipulation input" refers to an input which is done as the result of the user's manipulation such as press down of the button, and which causes the AV data reproducing apparatus 210 to carry out the control. A specific example of the input is an input of instructing (i) start of the reproduction of the AV data, (ii) suspending thereof, and (iii) fast-forwarding thereof. Note that, the AV data reproducing apparatus 210 may be provided with (i) the aforementioned standard keys, and (ii) a special key such as "a reproduction direction change key", "a reproduction speed change key", or the like. By pressing such a special key, the user can send an instruction corresponding to the function assigned to the special key.

The memory 212 temporarily stores information to be processed by the control section 213. A specific example of the information is correlation information 222 described later.

The control section 213 receives the manipulation input from the key input section 211, and sends control information to the memory 212, the reading section 214, the icon displaying section 215, and the AV data reproducing section 216. Further, the control section 213 includes a main function control section (main function control means) 231 for carrying out control of the operation to be carried out in response to the manipulation. The control is carried out in accordance with key control information 222b described later. Note that the control section 213 can cause the memory 212 to store, at an arbitrary timing, information stored in the recording medium 220.

When the reading section 214 receives, from the control section 213, an instruction of reading out the information from the recording medium 220, the reading section 214 reads out the information therefrom in accordance with the instruction (readout instruction). Specifically, the reading section 214 reads out the AV data 221, the correlation information 222, and icon data (image information) 233, from the recording medium 220. Note that the number of media that can be controlled by the reading section 214 is not limited to one. Note also that the type of medium that can be controlled by the reading section 214 is not limited to one type.

The AV data reproducing section 216 receives, from the control section 213, an instruction of reproducing the AV data stored in the recording medium 220. Upon the reception, the AV data reproducing section 216 converts (i) the AV data 221 read out by the reading section 214 from the recording medium 220, into (ii) data compliant with an AV output format. Then, the AV data reproducing section 216 sends the data to the output section 217.

The icon display section 215 receives, from the control section 213, an instruction of displaying the icon. Upon the reception, the icon display section 215 uses the icon data 223 to display the icon. Note that ways of displaying the icon are not particularly limited, and can be arbitrarily selected according to respective specifications of the AV data reproducing apparatus 210 and the recording medium 220. For example, the icon may continue to be displayed while a specific process is carried out. Alternatively, the icon may be so displayed as to blink. Further, the icon may be an animation. Alternatively, the display of the icon may be carried out in such a manner that: the icon is normally displayed during a certain period of time just after the manipulation, and is so displayed as to blink, and then is so displayed as to be an animation. Further, the icon data 223 may include designation of the way of displaying the icon.

The output section 217 superimposes (overlays) (i) the AV output supplied from the icon display section 215, on (ii) the AV output supplied from the AV data reproducing section 216. Then, the output section 217 supplies the AV outputs to an AV output apparatus (not shown) connected to the AV data reproducing apparatus 210. The output section 217 is a component output apparatus connected to, e.g., a television or the like. Alternatively, the output section 217 may be an output apparatus such as a television.

Next, the recording medium 220 is an external recording medium such as DVD-ROM. The AV data 221, the correlation information 222, and the icon data 223 are stored in the recording medium 220 such that they can be supplied to the AV data reproducing apparatus 210. Note that the number of the recording medium 220 is not limited to one, and the information may be continuously stored in a plurality of media.

The AV data 221 is AV data of a content stored in the recording medium 220. A specific example of the content is a movie.

Set in the correlation information 222 is at least correlation between each of the keys and the icon data. The correlation information 222 is loaded in the memory 212 as required. In reference to the correlation information 222, the control section 213 invokes (calls up) the icon data 223 corresponding to the key manipulation. Note that the icon data 233 may be loaded in advance in the memory 212.

The icon data 223 is invoked by the control section 213 as such, and is reproduced by the icon display section 215.

Explained here is the correlation information 222, with reference to FIG. 11. FIG. 11 is an explanatory diagram illustrating a specific example of the correlation information 222. As shown in FIG. 11, in the correlation information 222, scene specifying information 222a for specifying a scene of the content is so set as to be correlated with each of the key control information (main function control information) 222b and icon correlation information (additional function information) 222c.

Recorded in the scene specifying information 222a are: (i) the start position of each scene of the content, and (ii) the end position thereof. The scene specifying information 222a may be an index other than the reproduction time, as long as the scene specifying information 222a specifies the scene of the AV data 221. A specific example of the index is the number of bytes, which number is counted from a head. Alternatively, items of the correlation information 222 are prepared such that: the items respectively correspond to the scenes of the AV data 221, and are respectively multiplexed with the scenes. With this, each of the scenes can be specified. In this case, the correlation information 222 does not include the scene specifying information 222a, i.e., merely includes the key control information 222b and the icon correlation information 222c.

Recorded in the key control information 222b is information indicating whether or not execution of each main function is approved. The main function is the intrinsic function corresponding to a manipulation input. In other words, the key control information 222b is information for controlling the function assigned to the key manipulated by the user. For example, when the key control information 222b indicates that the pausing is not approved, the main function control section 231 prohibits pause processing. The target of this setting is not limited to one key, and a plurality of key control information items can be set simultaneously. For example, flags indicative of whether functions are enabled or disabled may be set to all the keys, respectively. Note that, in cases where the function of prohibiting the processing is not required, the correlation information 222 does not include the key control information 222b.

Recorded in the icon correlation information 222c is correlation between (i) the key corresponding to the manipulation input, and (ii) the icon data 223. So, see an example in which the AV data reproducing apparatus 210 reads out the correlation information 222 shown in FIG. 11, and in which the key input section 211 detects that the pause key is manipulated during reproduction of the scene corresponding to a period of time from 0 second to 49 seconds. In response to the detection, the main function control section 231 disables and cancels the key manipulation, and the reading section 214 reads out, from the recording medium 220, icon data specified by the icon correlation information 222c, and the icon displaying section 215 displays the icon data thus read out. In the above example, the key targeted for the setting is a key whose manipulation is "disapproved"; however, the present invention is not limited to this, and the target key may be a key whose manipulation is "approved". Further, as is the case with the key control information 222b, the key targeted for the setting is not limited to one key, and a plurality of key control information items can be set simultaneously. Further, the key specified by the icon correlation information 222c does not need to correspond to the key specified by the key control information 222b. Further, the correlation icon data 223 corresponding to the key manipulation may be loaded in advance in the memory 212.

Explained next is an correlation information readout process carried out before the AV data reproducing apparatus 210 reproduces the AV data 221.

Firstly, when the reproduction of certain AV data 221 is triggered, the control section 213 accesses the recording medium 220 via the reading section 214.

Next, the control section 213 checks whether or not the correlation information 222 corresponding to the AV data 221 is stored in the recording medium 220. In cases where the correlation information 222 is stored therein, the control section 213 causes the memory 212 to store the correlation information 222 read out from the recording medium 220 by the reading section 214, and then the correlation information readout process is terminated. On the other hand, in cases where no correlation information 222 is stored in the recording medium 220, the correlation information readout process is terminated.

Figure 12:
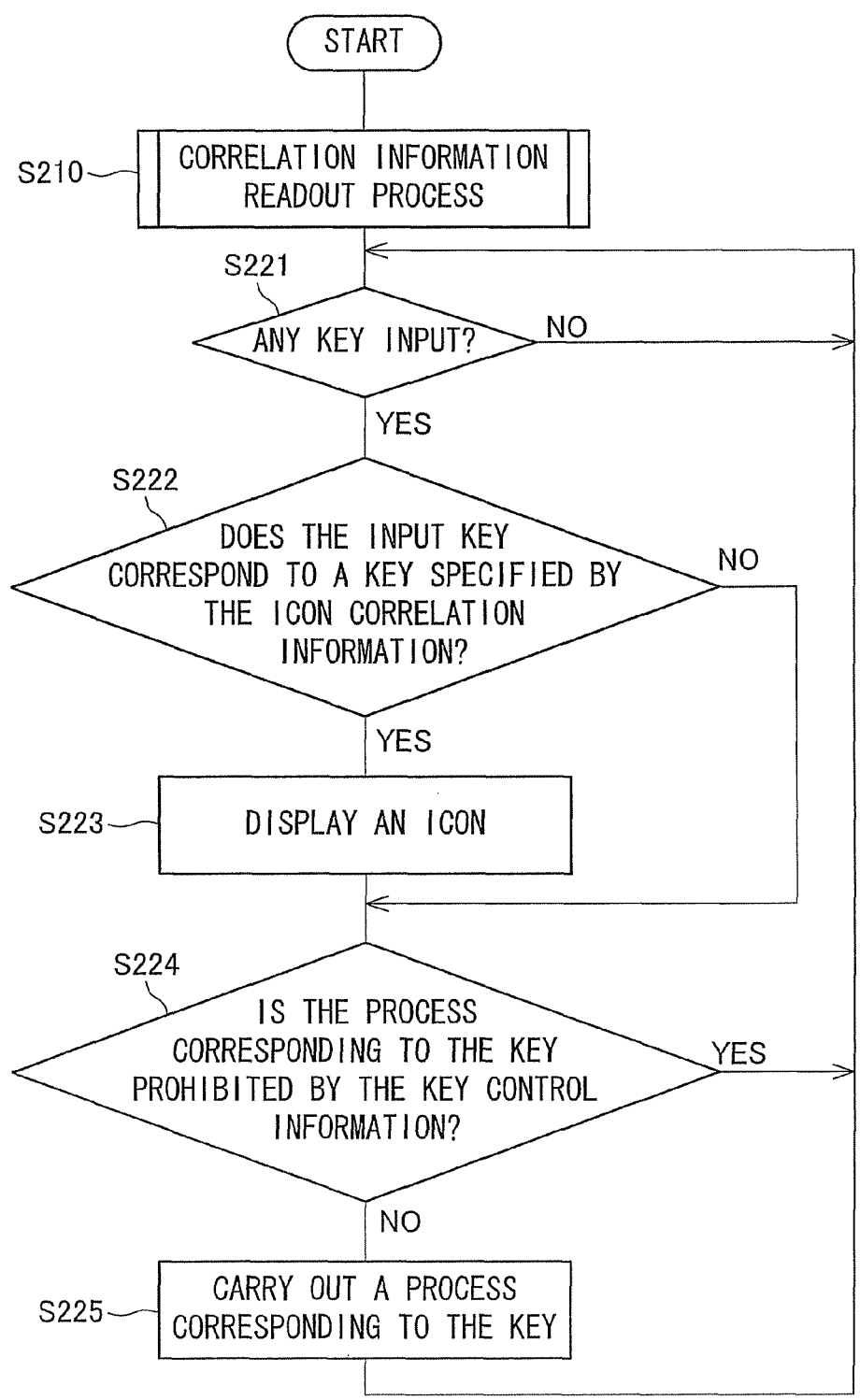
FIG. 12 is a flowchart, illustrating procedure of a process carried out while the AV data reproducing apparatus shown in FIG. 10 reproduces AV data.

The following explains control carried out while the AV data reproducing apparatus 210 reproduces the AV data 221, with reference to FIG. 12. FIG. 12 is a flowchart illustrating the control carried out while the AV data reproducing apparatus 210 reproduces the AV data.

Firstly, the control section 213 carries out the aforementioned correlation information readout process when starting the reproduction (S210).

Next, the control section 213 checks the key input section 211, i.e., checks whether or not the user has manipulated any key (S221). In cases where no key manipulation was carried out (NO in S221), the sequence goes back to the step S221.

On the other hand, in cases where the key manipulation input was carried out (YES in S221), the control section 213 judges whether or not the key manipulated by the user corresponds to the key (specified key) specified by the icon additional information 222c of the correlation information 222 temporarily stored in the memory 212 (S222). In cases where the key manipulated by the user is so judged as to correspond to the specified key (YES in S222), the control section 213 reads out, from the recording medium 220 via the reading section 214, the icon data 223 corresponding to the key manipulation input done in S221. The icon data 223 thus read out is sent to the icon displaying section 215. The icon displaying section 215 displays the received icon data, in accordance with the control information sent from the control section 213 (S223). Note that the icon data 223 may be read in advance.

Next, the main function control section 231 of the control section 213 judges whether or not the key manipulated by the user corresponds to the key specified by the correlation information 222 temporarily stored in the memory 212, i.e., judges whether or not the process corresponding to the manipulated key is approved (S224). In cases where the process corresponding to the key is not prohibited (NO in S224), the main function control section 231 carries out the process corresponding to the key (S225). Then, the control section 213 waits for a next key input, i.e., the sequence goes back to S221. On the other hand, in cases where the process corresponding to the key is so judged as to be prohibited (YES in S224), the main function control section 231 never carries out the process corresponding to the key. Then, the control section 213 waits for a next key input, i.e., the sequence goes back to S221.

For example, while the AV data reproducing apparatus 210 having read out the correlation information 222 shown in FIG. 11 reproduces the scene corresponding to the period of time from 0 second to 49 seconds, the main function control section 231 carries out processes respectively corresponding to keys other than the pause key, in response to manipulation of the keys. On the other hand, the following operations (1) and (2) are carried out in cases where the pause key is manipulated during the reproduction of the scene: (1) the icon display section 215 displays an icon i1 with which the icon correlation information 222c correlates the pause key (S223); and (2) the main function control section 231 carries out no process because the manipulation of the key is "disapproved" by the key control information 222b (YES in S224).

The following explains a specific example of the icon data 223 with reference to FIG. 13. FIG. 13 describes an example in which the icon data 223 correlated with the pause key is displayed on a screen during reproduction of a scene prohibiting the pausing manipulation. The icon i1 is such an icon that represents a protagonist of a movie contained in the AV data 221, and that notifies the user that the manipulation is prohibited. The icon i1 is so displayed on the screen as to be superimposed on a part of the display of the AV data. It is preferable that the normal warning display be restrained on this occasion. As such, the indication using the warning display concerning the content is not mere warning display. Such warning display made in response to the manipulation prohibited in the scene secures an atmosphere of the content, with the result that the user feels less unpleasant.

The above example explained with reference to FIG. 13 assumes that the display of the icon data is carried out in response to the manipulation input of the key whose manipulation is prohibited; however, the present invention is not limited to this, and the icon data may be displayed in response to manipulation of a key whose manipulation is approved. For example, an icon indicating the fast-forwarding can be displayed during the fast-forwarding process carried out in a scene approving the fast-forwarding manipulation, in response to the fast-forwarding manipulation. This makes it possible for the user to recognize that the key manipulation input is surely received by the AV data reproducing apparatus.

Note that the present embodiment assumes the case where the icon data 223 is stored in the recording medium 220; however, the icon data 223 may be stored in the AV data reproducing apparatus 210. Alternatively, the icon data may be stored in a recording medium other than the recording medium 220, and be supplied to the AV data reproducing apparatus 210. The icon data thus supplied is reproduced when the AV data 221 of the recording medium 220 is reproduced.

Further, the icon data 223 can be read out from the recording medium 220. Alternatively, the icon data 223 may be stored in advance in the AV data reproducing apparatus 210, or may be acquired from another recording medium or an external apparatus. Alternatively, a plurality of icon data items may be supplied from different sources, and the icon data items thus supplied may be reproduced in combination in accordance with the icon correlation information 222c of the correlation information 222 when reproducing AV data 221 of one recording medium 220.

Further, the present embodiment exemplifies the icon; however, the present invention is applicable to any image information including a moving image and a still image. Further, the image information is not limited to such image information that indicates (i) which process is carried out, and/or (ii) which manipulation is prohibited. The image information may be, e.g., advertisement information or image information serving as a screen accessory. Further, instead of the image information, text information (character information; letter information) may be displayed. Examples of the information displayed with the use of the characters include: information about a process, prohibition information, advertisement information, and the like. In this case, the reading section (text information reading means) 214 reads out, from the recording medium 220, text data stored in the same manner as the icon data 223 is stored. The text data thus read out is displayed by the icon displaying section (additional function executing means) 215.

Further, such an "icon display" function of the present embodiment can be realized by the additional function program explained in Embodiment 1. The difference between the additional function, program executing section 15 (see FIG. 1) of Embodiment 1 and the icon displaying section 215 (see FIG. 10) of the present embodiment lies in that: the additional function program executing section 15 interprets (reads) a program language such as Java® or C language so as to execute the additional function program, whereas the icon displaying section 215 only decodes the image data compliant with the JPEG format, the GIF format, or the like. Specifically, the difference lies in that: the additional function program executing section 15 needs to decode the image data of the icon after executing an additional function program for displaying the icon, whereas the icon displaying section 215 does not need to execute such an additional function program and merely needs to decode the image data of the icon. Therefore, the present embodiment allows reduction of throughput of a CPU, as compared with Embodiment 1.

Note that the present embodiment never limits the scope of the present invention, and can be varied within the scope of the present invention. For example, the present embodiment can be arranged as follows.

An AV data reproducing apparatus (information reproducing apparatus) of the present invention for controlling, in accordance with a manipulation input, reproduction of content data read out from a content recording medium, the AV data reproducing apparatus may include: (i) image information reading means for reading out image information such as an icon; (ii) image information correlation information reading means for reading out, from the content recording medium, image information correlation information for correlating the manipulation input with the image information; and (iii) image information displaying means for displaying the image information in response to the manipulation input. This makes it possible that display unique to the content is carried out in response to the manipulation input. Further, the content data and the image information can be supplied from the same content recording medium, so that data handling and medium handling are easy.

Further, the AV data reproducing apparatus (information reproducing apparatus) may be arranged such that: the additional function is a function of displaying the image information, and the additional function executing means serves as the image information displaying means. Further, the AV data reproducing apparatus (image reproducing apparatus) may be arranged such that: the additional function is a function of displaying text information, and the additional function executing means serves as text information displaying means.

Embodiment 3

Still another embodiment of the present invention will be described below with reference to FIG. 14 through FIG. 17. Note that the structure of the present embodiment is substantially the same as the structure of Embodiment 1, so that each of members corresponding to the members of Embodiment 1 is given a reference numeral obtained by giving a numeral "3" in front of each of the reference numerals of the members of Embodiment 1. Further, the wordings defined in Embodiments 1 and 2 are used in the same manner in the present embodiment, unless otherwise noted.

An AV data reproducing apparatus (information reproducing apparatus) 310 according to the present embodiment outputs, in response to a key input manipulation, a sound concerning AV data that is being currently reproduced. Explanation here assumes that the sound is short audio information; however, the present embodiment is not limited to the short audio information, and is applicable to any audio information.

Specifically speaking, the structure of the AV data reproducing apparatus 310 is obtained by replacing (i) the additional function program executing section 15 of the AV data reproducing apparatus 10 shown in FIG. 1 and described in Embodiment 1, with (ii) a sound data reproducing section (additional function executing means; audio information reproducing means) 315. That is, the AV data reproducing apparatus 10 executes the additional function program in response to the key input, while reproducing the AV data. On the other hand, while reproducing the AV data, the AV data reproducing apparatus 310 outputs the sound in response to the key input.

FIG. 14 is a function block diagram schematically illustrating the structure of the AV data reproducing apparatus 310. The AV data reproducing apparatus 310 carries out and controls reproduction of AV data (content data) 321 read out from a recording medium (content recording medium) 320. The control is carried out in accordance with the manipulation input. Therefore, the AV data reproducing apparatus 310 includes: a key input section 311, a memory 312, a control section 313, a reading section (audio information reading means) 314, the sound data reproducing section 315, an AV data reproducing section 316, and an output section 317, as shown in FIG. 14.

The key input section 311 acquires the manipulation input sent to the AV data reproducing apparatus 310. Here, the wording "key" refers to a button provided in either a manipulation panel of the AV data reproducing apparatus 310 or a remote controller thereof. Examples of the button include: a "play button", a "stop button", a "pause button", a "fast-forward button", a "backward button", and the like. Further, the wording "the manipulation input" refers to an input which is done as the result of the user's manipulation such as press down of the button, and which causes the AV data reproducing apparatus 210 to carry out the control. A specific example of the input is an input of instructing (i) start of the reproduction of the AV data, (ii) suspending thereof, and (iii) fast-forwarding thereof. Note that, the AV data reproducing apparatus 310 may be provided with (i) the aforementioned standard keys, and (ii) a special key such as "a reproduction direction change key", "a reproduction speed change key", or the like. By pressing such a special key, the user can send an instruction corresponding to the function assigned to the special key.

The memory 312 temporarily stores information to be processed by the control section 313. A specific example of the information is correlation information 322 described later.

The control section 313 receives the manipulation input from the key input section 311, and sends control information to the memory 312, the reading section 314, the sound data reproducing section 315, and the AV data reproducing section 316. Further, the control section 313 includes a main function control section (main function control means) 331 for carrying out control of the operation corresponding to the manipulation input. The control is carried out in accordance with key control information 322b described later. Note that the control section 313 can cause the memory 312 to store, at an arbitrary timing, information stored in the recording medium 320.

When the reading section 314 receives, from the control section 313, an instruction of reading out the information from the recording medium 320, the reading section 314 reads out the information therefrom in accordance with the instruction (readout instruction). Specifically, the reading section 314 reads out the AV data 321, the correlation information 322, and sound data (audio information) 323, from the recording medium 320. Note that the number of media that can be controlled by the reading section 314 is not limited to one. Note also that the type of medium that can be controlled by the reading section 314 is not limited to one type.

The AV data reproducing section 316 receives, from the control section 313, an instruction of reproducing the AV data stored in the recording medium 320. Upon the reception, the AV data reproducing section 316 converts (i) the AV data 321 read out by the reading section 314 from the recording medium 320, into (ii) data compliant with an AV output format. Then, the AV data reproducing section 316 sends the data to the output section 317.

The sound data reproducing section 315 receives, from the control section 313, an instruction of reproducing the sound data, and reproduce the sound data. Note that ways of reproducing the sound are not particularly limited, and can be arbitrarily selected according to respective specifications of the AV data reproducing apparatus 310 and the recording medium 320. For example, the sound may be reproduced repeatedly while a specific process is carried out. Alternatively, the sound may be reproduced only once while the specific process is carried out. Alternatively, the sound may be reproduced the specific number of times, while the specific process is carried out.

The output section 317 overlays (i) the AV output supplied from the sound data reproducing section 315, with (ii) the AV output supplied from the AV data reproducing section 316. Then, the output section 317 supplies the overlaid AV outputs to an AV output apparatus (not shown) connected to the AV data reproducing apparatus 310. The output section 317 is a component output apparatus, connected to, e.g., a television or the like. Alternatively, the output section 317 may be an output apparatus such as a television.

Next, the recording medium 320 is an external recording medium such as DVD-ROM. The AV data 321, the correlation information 322, and the sound data 323 are stored in the recording medium 320 such that they can be supplied to the AV data reproducing apparatus 310. Note that the number of the recording medium 320 is not limited to one, and the information may be continuously stored in a plurality of media.

The AV data 321 is AV data of a content stored in the recording medium 320. A specific example of the content is a movie.

Set in the correlation information 322 is at least correlation between each of the keys and the sound data. The correlation information 322 is loaded in the memory 312 as required. In reference to the correlation information 322, the control section 313 invokes (calls up) the sound data 323 corresponding to key manipulation. Note that the sound data 323 may be loaded in the memory 312 in advance.

The sound data 323 is invoked by the control section 313 as such, and is reproduced by the sound data reproducing section 315.

Explained here is the correlation information 322, with reference to FIG. 15. FIG. 15 is an explanatory diagram illustrating a specific example of the correlation information 322. See FIG. 15. In the correlation information 322, each of the key control information 322b (main function control information) and the sound correlation information (additional function information) 322c is so set as to be correlated with scene specifying information 322a.

Recorded in the scene specifying information 322a are: (i) the start position of each scene of the content, and (ii) the end position thereof. The scene specifying information 322a may be an index other than the reproduction time, as long as the scene specifying information 322a specifies the scene of the AV data 321. A specific example of the index is the number of bytes, which number is counted from a head. Alternatively, items of the correlation information 322 are prepared such that: the items respectively correspond to the scenes of the AV data 321, and are respectively multiplexed with the scenes. With this, each of the scenes can be specified. In this case, the correlation information 322 does not include the scene specifying information 322a, i.e., merely includes the key control information 322b and the sound correlation information 322c.

Recorded in the key control information 322b is information indicating whether or not execution of each main function is approved. The main function is the intrinsic function corresponding to a manipulation input. In other words, the key control information 322b is information for controlling the function assigned to the key manipulated by the user. For example, when the key control information 322b indicates that the pausing is disapproved, the main function control section 331 prohibits pause processing. The target of this setting is not limited to one key, and a plurality of key control information items can be set simultaneously. For example, flags indicative of whether functions are enabled or disabled may be set to all the keys, respectively. Note that, in cases where the function of prohibiting the processing is not required, the correlation information 322 does not include the key control information 322b.

Recorded in the additional function information 322c is correlation between (i) the key corresponding to the manipulation input, and (ii) the sound data 323. So, see an example in which the AV data reproducing apparatus 310 reads out the correlation information 322 shown in FIG. 15, and in which the key input section 311 detects that the pause key is manipulated during reproduction of a scene corresponding to a period of time from 0 second to 49 seconds. In response to the detection, the main function control section 331 disables and cancels the key manipulation, and the reading section 314 reads out specified sound data 323 from the recording medium 320, and the sound data reproducing section 315 reproduces the sound data 323 thus read out. In the above example, the key targeted for the setting is a key whose manipulation is "disapproved"; however, the present invention is not limited to this, and the target key may be a key whose manipulation is "approved". Further, as is the case with the key control information 322b, the key targeted for the setting is not limited to one key, and a plurality of key control information items can be set simultaneously. Further, the key specified by the sound correlation information 322c does not need to correspond to the key specified by the key control information 322b. Further, the sound data 323 corresponding to the key manipulation may be loaded in advance in the memory 312.

Explained next is a correlation information readout process carried out before the AV data reproducing apparatus 310 reproduces the AV data 321.

Firstly, when the reproduction of certain AV data 321 is triggered, the control section 313 accesses the recording medium 320 via the reading section 314.

Next, the control section 313 checks whether or not the correlation information 322 corresponding to the AV data 321 is stored in the recording medium 320. In cases where the correlation information 322 is stored therein, the control section 313 causes the memory 312 to store the correlation information 322 read out from the recording medium 320 by the reading section 314, and then the correlation information readout process is terminated. On the other hand, in cases where no correlation information 322 is stored in the recording medium 320, the correlation information readout process is terminated.

Figure 16:
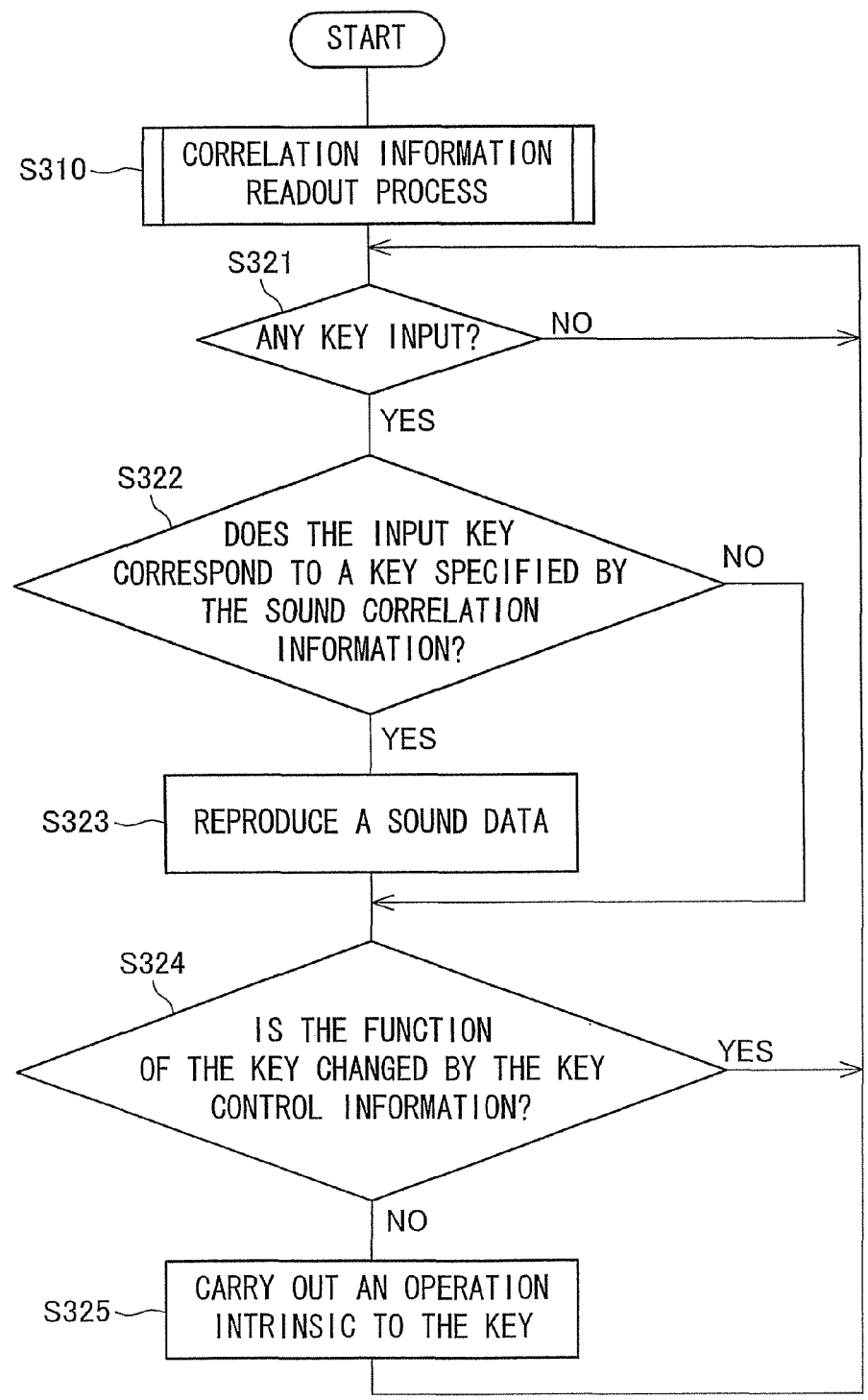
FIG. 16 is a flowchart illustrating procedure of a process carried out while the AV data reproducing apparatus shown in FIG. 14 reproduces AV data.

The following explains control carried out while the AV data reproducing apparatus 310 reproduces the AV data 321, with reference to FIG. 16. FIG. 16 is a flowchart illustrating the control carried out while the AV data reproducing apparatus 310 reproduces the AV data.

Firstly, the control section 313 carries out the aforementioned correlation information readout process when starting the reproduction (S310).

Next, the control section 313 checks the key input section 311, i.e., checks whether or not the user has manipulated any key (S321). In cases where no key manipulation was carried out (NO in S321), the sequence goes back to the step S321.

On the other hand, in cases where the key manipulation input was carried out (YES in S321), the control section 313 judges whether or not the key manipulated by the user corresponds to the key (specified key) specified by the sound correlation information 322c of the correlation information 322 temporarily stored in the memory 312 (S322). In cases where the key manipulated by the user is so judged as to correspond to the specified key (YES in S322), the control section 313 reads out, from the recording medium 320 via the reading section 314, sound data 323 corresponding to the key manipulation input done in S321. The sound data 323 thus read out is sent to the sound data reproducing section 315. The sound data reproducing section 315 starts to reproduce the received sound data 323, in accordance with the control information sent from the control section 313 (S323). Note that the sound data 323 may be read in advance.

Next, the main function control section 331 of the control section 313 judges whether or not the key manipulated by the user corresponds to the key specified by the key control information 322b of the correlation information 312 temporarily stored in the memory 312, i.e., judges whether or not the process corresponding to the manipulated key is approved (S324). In cases where the process corresponding to the key is not prohibited (NO in S324), the main function control section 331 carries out the process corresponding to the key (S325). Then, the control section 313 waits for a next key input, i.e., the sequence goes back to S321. On the other hand, in cases where the process corresponding to the key is so judged as to be prohibited (YES in S324), the main function control section 331 never carries out the process corresponding to the key. Then, the control section 313 waits for a next key input, i.e., the sequence goes back to S321.

For example, while the AV data reproducing apparatus 310 having read out the correlation information 322 shown in FIG. 15 reproduces the scene corresponding to the period of time from 0 second to 49 seconds, the main function control section 331 carries out processes respectively corresponding to keys other than the pause key, in response to manipulation of the keys. On the other hand, the following operations (1) and (2) are carried out in cases where the pause key is manipulated during the reproduction of the scene: (1) the sound data reproducing section 315 reproduces a sound a1 with which the sound correlation information 322c correlates the pause key (S323); and (2) the main function control section 331 carries out no process because the manipulation of the key is "disapproved" by the key control information 322b (YES in S324).

Figure 17:
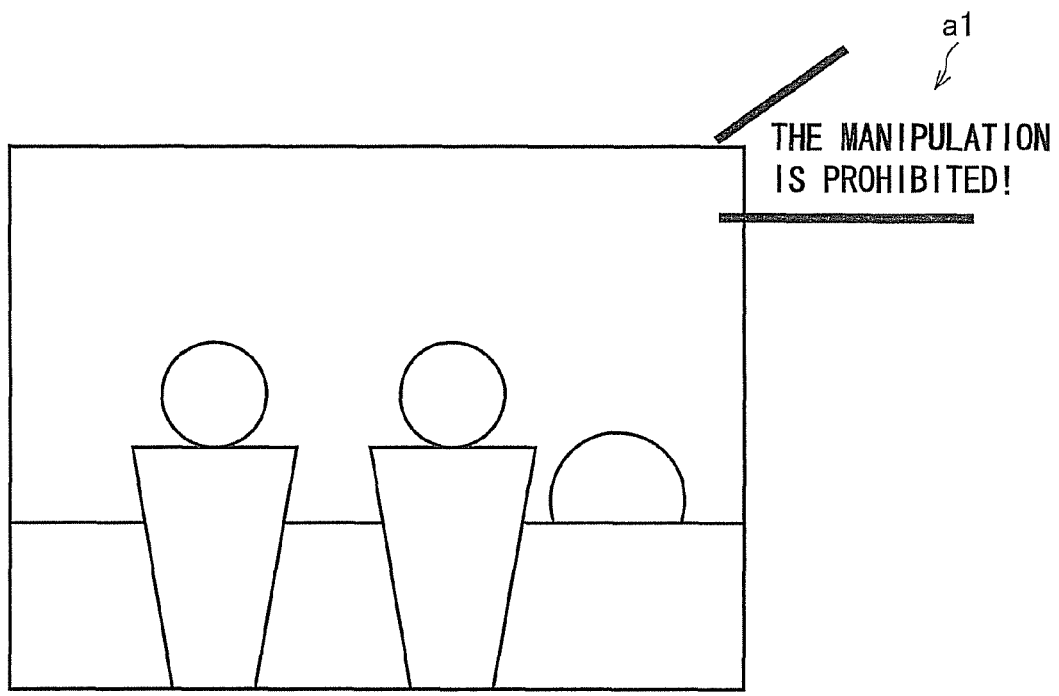
FIG. 17 is an explanatory diagram illustrating one example of screen display and audio output each carried out by the AV data reproducing apparatus shown in FIG. 14.

The following explains a specific example of the sound data 323 with reference to FIG. 17. FIG. 17 describes an example in which the sound data 323 correlated with the pause key is outputted during reproduction of a scene prohibiting the pausing manipulation. The sound a1 uses a voice of a protagonist of a movie contained in the AV data 321, and notifies the user that the manipulation is prohibited. The sound data is reproduced together with the sound of the AV data, or is reproduced with the sound of the AV data muted. It is preferable that the normal warning sound be restrained on this occasion. As such, the indication using the warning sound concerning the content is not a mere warning sound. Such a warning sound made in response to the manipulation prohibited in the scene secures an atmosphere of the content, with the result that the user feels less unpleasant.

The above example explained with reference to FIG. 17 assumes that the output of the sound data is carried out in response to the manipulation input of the key whose manipulation is prohibited; however, the present invention is not limited to this, and the sound data may be outputted in response to manipulation of a key whose manipulation is approved. For example, a sound indicating the fast-forwarding can be outputted during the fast-forwarding process carried out in a scene approving the fast-forwarding manipulation, in response to the fast-forwarding manipulation. A specific example of such a sound is a voice saying "Fast-forwarding starts". This makes it possible for the user to recognize that the key manipulation input is surely received by the AV data reproducing apparatus.

Further, some AV data reproducing apparatus at present has a function of outputting a sound of AV data during fast-forwarding reproduction. To accommodate such an apparatus, there may be given (set), to each key manipulation set in the sound correlation information 322c, flag information indicating whether or not the sound of the AV data is to be outputted. The use of the flag information makes it possible to select whether (i) the sound of the AV data and the sound data are to be outputted simultaneously, or (ii) only the sound data is to be outputted.

Note that the present embodiment assumes the case where the sound data 323 is stored in the recording medium 320; however, the sound data 323 may be stored in the AV data reproducing apparatus 310. Alternatively, the sound data may be stored in a recording medium other than the recording medium 320, and be supplied to the AV data reproducing apparatus 310. The sound data thus supplied is reproduced when the AV data 321 of the recording medium 320 is reproduced.

Further, the sound data 323 can be read out from the recording medium 320. Alternatively, the sound data 323 may be stored in advance in the AV data reproducing apparatus 310, or may be acquired from another recording medium or an external apparatus. Alternatively, a plurality of sound data items 323 may be supplied from different sources, and the sound data items 323 thus supplied may be reproduced in combination in accordance with the sound correlation information 322c of the correlation information 322 when reproducing AV data 321 of one recording medium 320.

Further, the present embodiment exemplifies the short audio information; however, the present invention is applicable to any audio information. Further, the audio information is not limited to such audio information that indicates (i) which process is carried out, and/or (ii) which manipulation is prohibited. The audio information may be, e.g., advertisement information or accessory-like information such as a joke.

Further, such a "sound output" function of the present embodiment can be realized by the additional function program, explained in Embodiment 1. The difference between the additional function program executing section 15 (see FIG. 1) of Embodiment 1 and the sound data reproducing section 315 (see FIG. 14) of the present embodiment lies in that: the additional function program executing section 15 interprets (reads) a program language such as Java® or C language so as to execute the additional function program, whereas the sound data reproducing section 315 only decodes the sound data compliant with the WAV format or the like. Specifically, the difference lies in that: the additional function program executing section 15 needs to decode the sound data of the sound after executing an additional function program for reproducing the sound, whereas the sound reproducing section 315 does not need to execute such an additional function program and merely needs to decode the sound data. Therefore, the present embodiment allows reduction of throughput of a CPU, as compared with Embodiment 1.

Note that the present embodiment never limits the scope of the present invention, and can be varied within the scope of the present invention. For example, the present embodiment can be arranged as follows.

An AV data reproducing apparatus (information reproducing apparatus) of the present invention for controlling, in accordance with a manipulation input, reproduction of content data read out from a content recording medium, the AV data reproducing apparatus may include: (i) audio information reading means for reading out audio information; (ii) audio information correlation information reading means for reading out, from the content recording medium, audio information correlation information for correlating the manipulation input with the audio information; and (iii) audio information reproducing means for reproducing the audio information in response to the manipulation input. This makes it possible that audio reproduction unique to the content is carried out in response to the manipulation input. Further, the content data and the audio information can be supplied from the same content recording medium, so that data handling and medium handling are easy.

Further, a flag indicative of whether or not the sound of the content data is reproduced can be recorded in the audio information correlation information. This makes it possible that the sound of the content data is muted as required while the audio information is reproduced. This supports the reproduction of the audio information.

Further, the AV data reproducing apparatus (information reproducing apparatus) of the present invention may be arranged such that: the additional function is a function of outputting the audio information, and the additional function executing means serves as the audio information reproducing means. Further, the AV data reproducing apparatus (information reproducing apparatus) of the present invention may be arranged such that: the additional function information includes the flag indicative of whether or not the sound of the content data is muted during the reproduction of the audio information.

Further, Embodiment 1 explains the AV data reproducing apparatus 10 for executing the additional function program in response to the key input while reproducing the AV data. Embodiment 2 explains the AV data reproducing apparatus 210 for displaying the icon in response to the key input while reproducing the AV data. Embodiment 3 explains the AV data reproducing apparatus 310 for outputting the sound in response to the key input while reproducing the AV data. However, it is possible to arrange an AV data reproducing apparatus having a function obtained by combining the functions of the AV data reproducing apparatuses 10, 210, and 310.

Finally, each block of the AV data reproducing apparatus 10, especially the control section 13 and the additional function program executing section 15, may be constituted by a hardware logic, or may be realized by a software with the use of a CPU as follows. (This is also true of the AV data reproducing apparatuses 210 and 310.)

That is, the AV data reproducing apparatus 10 includes: (i) a CPU (central processing unit) for executing an instruction of a control program realizing each function; (ii) a ROM (read only memory) for storing the program; (iii) a RAM (random access memory) for expanding the program; (iv) a memory apparatus (recording medium) such as a memory for storing the program and various types of data; and the like. Therefore, the object of the present invention is achieved by: (i) providing, in the AV data reproducing apparatus 10, a recording medium storing a computer-readable program code (executable program, intermediate code program, a source program) of the program for controlling the AV data reproducing apparatus 10, and (ii) causing a computer (or CPU, MPU (micro processing unit)) to read out and execute the program code stored in the storage medium. The control program is software for realizing the function.

Examples of the recording medium are: tapes such as a magnetic tape and a cassette tape; magnetic disks such as a Floppy® disk and a hard disk; optical disks such as a CD-ROM (compact disk read only memory), a magnetic optical disk (MO), a mini disk (MD), a digital video disk (DVD), and a CD-R (CD-Rewritable); and the like. Further, the recording medium may be: a card such as an IC card (including a memory card) and an optical card; or a semiconductor memory such as a mask ROM, an EPROM (electrically programmable read only memory), an EEPROM (electrically erasable programmable read only memory), or a flash ROM.

Further, the program code may be supplied to the AV data reproducing apparatus 10 via a communication network to which the AV data reproducing apparatus 10 is connectable. The communication network is not particularly limited. Specific examples thereof are: the Internet, intranet, extranet, LAN (local area network), ISDN (integrated services digital network), VAN (value added network), CATV (cable TV) communication network, virtual private network, telephone network, mobile communication network, satellite communication network, and the like. Further, the transmission medium constituting the communication network is not particularly limited. Specific examples thereof are: (i) a wired line using the IEEE (Institute of Electrical and Electronics Engineers) 1394, a USB (universal serial bus), a power-line communication, a cable TV line, a telephone line, a ADSL line, or the like; or (ii) a wireless line using IrDA, infrared rays used for a remote controller, Bluetooth®, IEEE 802.11, HDR (High Data Rate), a mobile phone network, a satellite connection, a terrestrial digital network, or the like. Note that the present invention can be realized by either a carrier wave or a data signal row, each of which represents the aforesaid program code and each of which is electrically transmitted.

For example, the present invention may be realized by an AV data reproducing program including the steps of: (a) receiving manipulation causing a computer to carry out an operation; and (b) controlling an AV data reproducing function intrinsic to the manipulation. In this case, the AV data reproducing program may be stored in a recording medium. Further, the AV data reproducing program may include the additional function program 23 which is stored in the recording medium 20, and which is executed in response to the manipulation. Further, the AV data reproducing program may include the correlation information 22 indicating the correlation between the manipulation and the additional function program 23 to be executed in response to the manipulation.

EXAMPLE

The following fully explains a case where the aforementioned AV data reproducing apparatus 10 is applied to a DVD player, with reference to FIG. 18 through FIG. 26. This is one example of the present invention.

Figure 19:
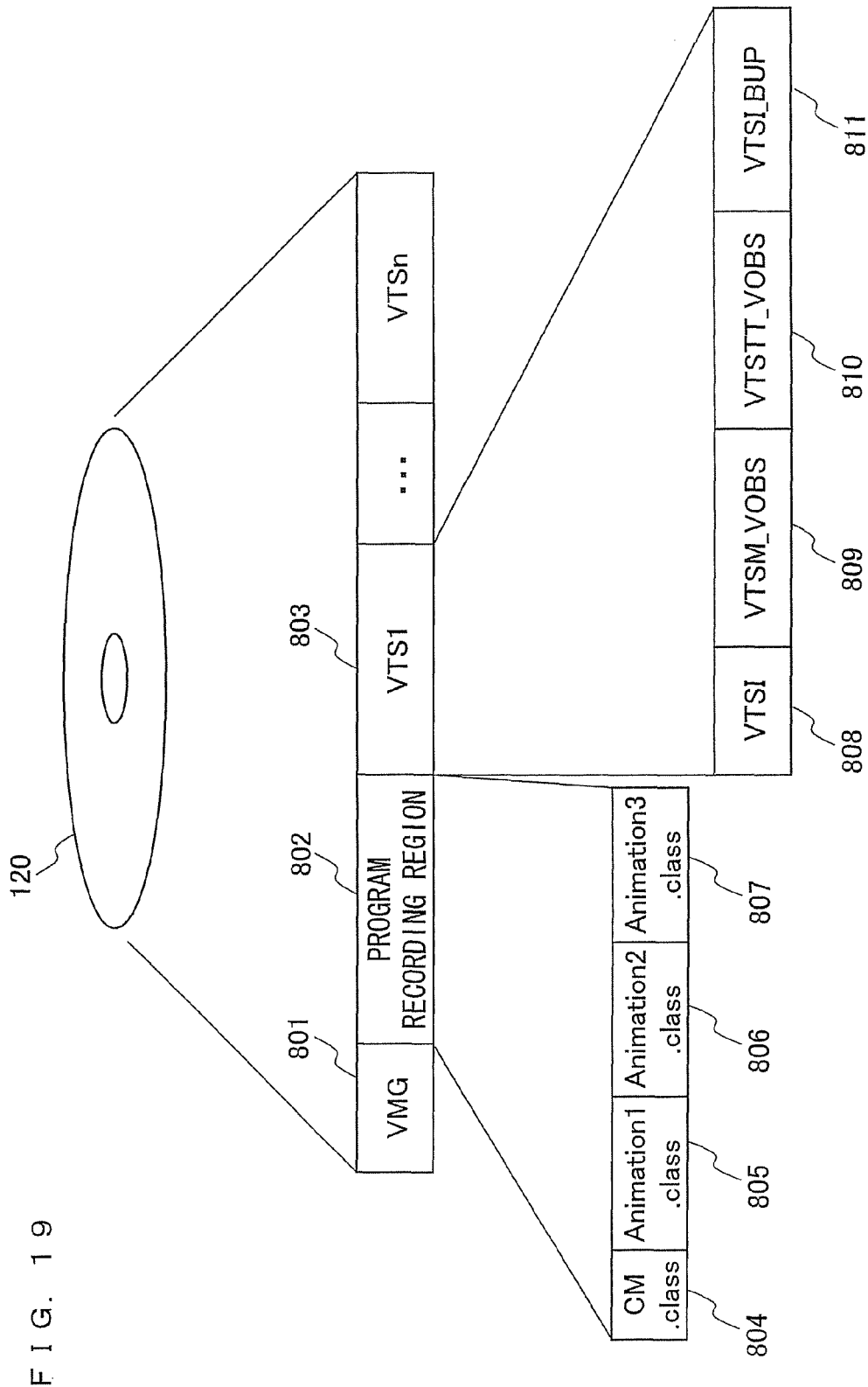
FIG. 19 is an explanatory diagram illustrating a data structure of data stored in a DVD-ROM to be reproduced by the DVD player shown in FIG. 18.
Figure 20:
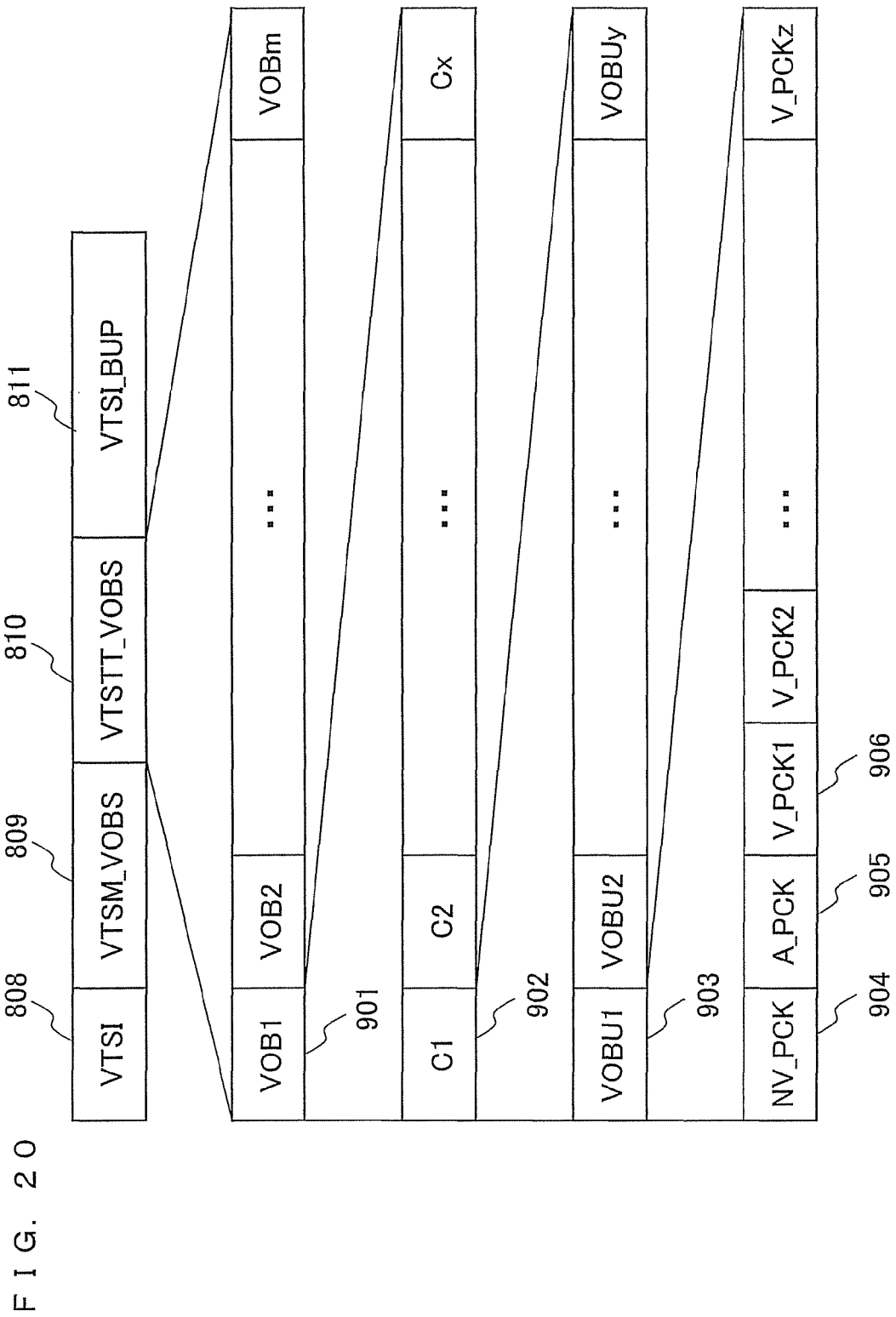
FIG. 20 is an explanatory diagram illustrating a data structure of VTSTT_VOBS shown in FIG. 19.
Figure 21:
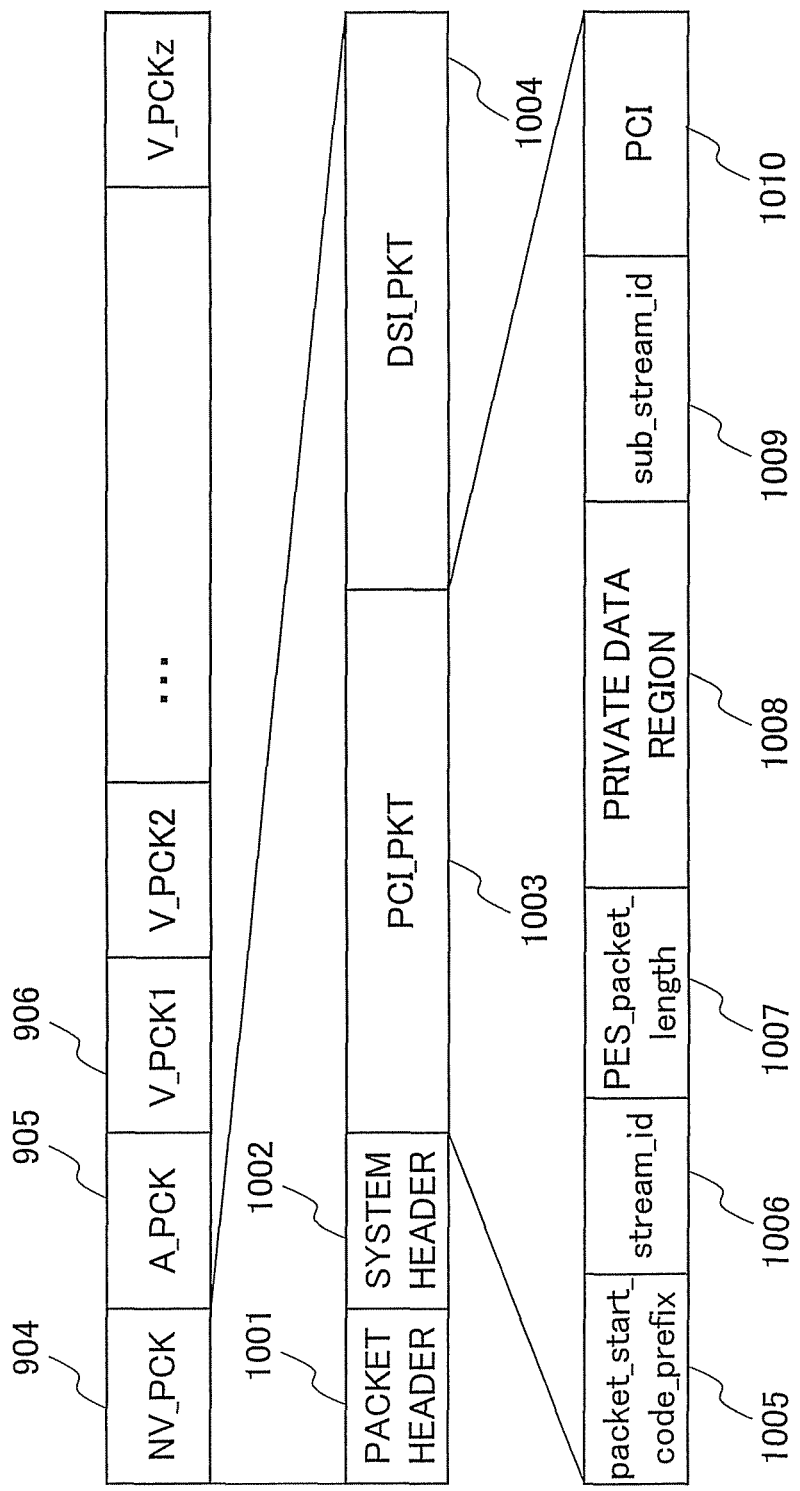
FIG. 21 is an explanatory diagram illustrating a data structure of NV_PCK shown in FIG. 20.
Figure 22:
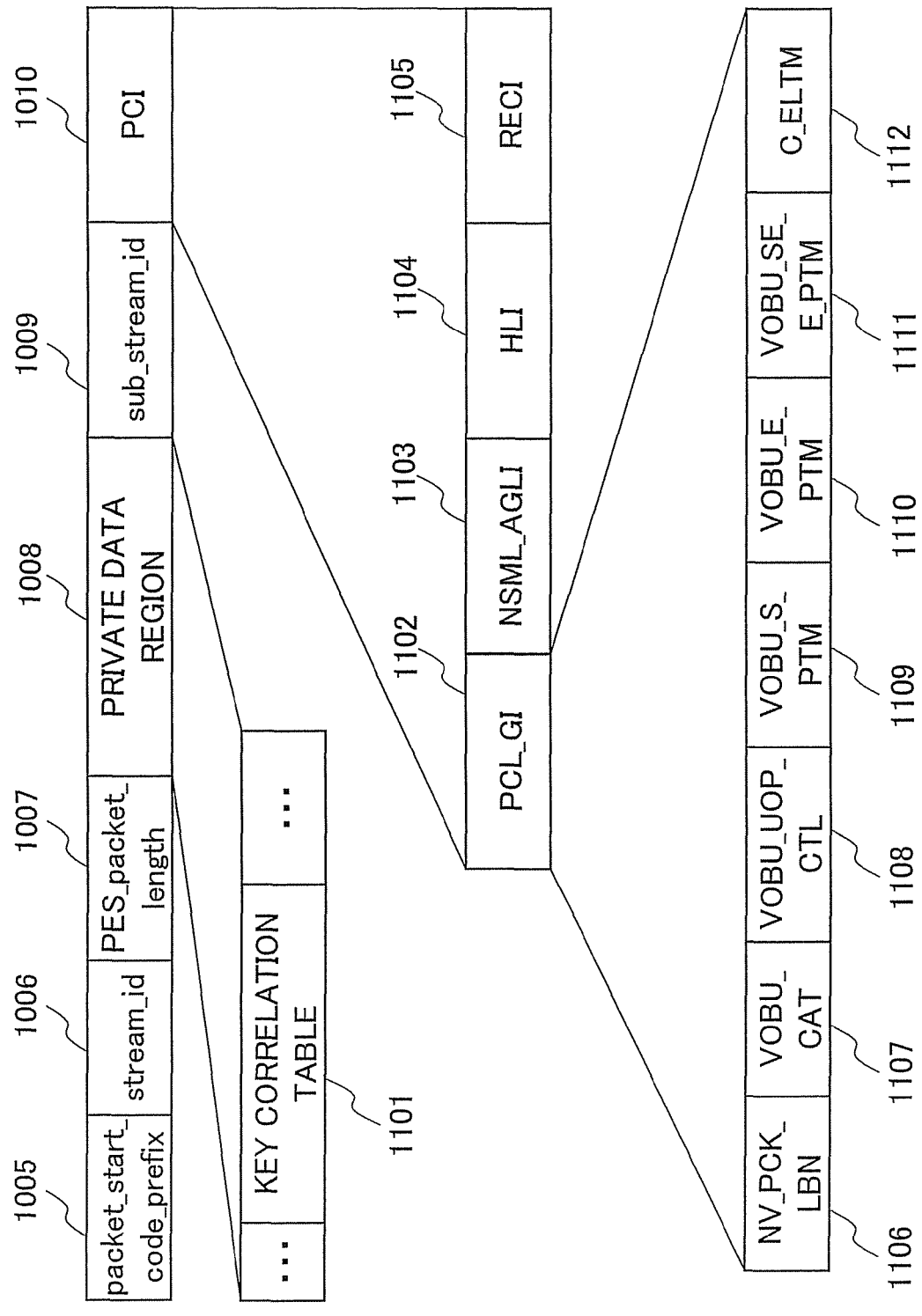
FIG. 22 is an explanatory diagram illustrating respective data structures of a private data region and PCI, each of which is shown in FIG. 21.

Each of FIG. 19 through FIG. 23 is an explanatory diagram illustrating a data structure of data stored in a DVD-ROM 120, which is a disk recording medium to be reproduced by a DVD player 110 according to the present example. Specifically, FIG. 19 is an explanatory diagram illustrating the data structure of the data stored in the DVD-ROM 120. FIG. 20 is an explanatory diagram illustrating a data structure of a VTSTT_VOBS (Video Object Set for Titles in a VTS) 810 shown in FIG. 19. FIG. 21 is an explanatory diagram illustrating a data structure of an NV_PCK (Navigation pack) 904. FIG. 22 is an explanatory diagram illustrating respective data structures of a private data region 1008 and PCI 1010, each of which is shown in FIG. 21. FIG. 23 is an explanatory diagram illustrating one example of a key correlation table 1101 stored in the private data region 1008 shown in FIG. 22.

See FIG. 19. Stored in the DVD-ROM 120 are: one VMG (Video Manager) 801 and a plurality of VTSs (Video Title Sets) 803. Stored in the VMG 801 is management information for managing respective recording positions of the VTSs 803. In response to insertion of the DVD-ROM 120, the DVD player 110 reads out the VMG 801 so as to display the title of AV data stored in the DVD-ROM 120.

Stored in each of the VTSs 803 are the AV data and reproduction control information of the AV data. The VTS 803 is made up of (i) VTSI (Video Title Set Information) 808, (ii) a VTSM_VOBS (Video Object Set for Video Title Set Menu) 809, (iii) the VTSTT_VOBS 810, and (iv) VTSI_BUP 811 serving as backup of the VTSI. Stored in the VTSI 808 is information for reproducing the VTSM_VOBS 809 and the VTSTT_VOBS 810. Stored in the VTSM_VOBS 809 is AV data for displaying the title menu. Stored in the VTSTT_VOBS 810 is the foregoing AV data.

Further, a program recording region 802 storing the aforementioned additional function programs is so allocated (provided) as to come before the VTS 803 in the order (readout order) in which the DVD player 110 reads the DVD-ROM 120. Accordingly, each of the additional function programs is read out prior to the readout of the AV data. The additional function program thus allocated to come before the VTS 803 in the readout order allows reduction of (i) frequencies of a seeking operation and (ii) a seeking distance. This makes it possible to shorten time required for a response to the user. In FIG. 19, the additional function programs stored in the program recording region 802 are: a CM.class 804, an Animation.1class 805, an Animation2.class 806, and an Animation3.class 807.

Note that the program recording region 802 is allocated between the VMG 801 and the VTS 803 in FIG. 19; however, the program recording region 802 may be allocated in each of the VTSs 803, so that the present invention is not limited to the above example. For example, a program shared by the VTSs 803 is stored in the VMG 801, and programs used respectively for the VTSs are stored in the VTSs 803 individually.

Next, see FIG. 20. The VTSTT_VOBS 810 is made up of a plurality of VOBs (Video Objects) 901. Specifically, the VTSTT_VOB 810 is divided into the VOBs 901 based on a continuous program stream as a unit. Each of the VOBs 901 is made up of a plurality of Cs (cells) 902, each of which serves as an access unit. Each of the Cs 902 is made up of a plurality of VOBUs (Video Object Units) 903, each of which serves as a video decode unit. Each of the VOBUs 903 is made up of one NV_PCK 904, a plurality of A_PCKs (Audio packs) 905, and a plurality of V_PCKs (Video packs) 906. Each of the A_PCKs 905 stores audio data of the AV data, and each of V_PCKs 906 stores image data of the AV data.

Next, see FIG. 21. The NV_PCK 904 is made up of a packet header 1001, a system header 1002, a PCI_PKT (PCI packets) 1003, and a DSI_PKT (DSI packet) 1004. The PCI_PKT 1003 stores PCI (Presentation Control Information) 1010 for carrying out reproduction control of the AV data. Note that the other data is irrelevant to the present invention, so that explanation thereof is omitted here.

Next, see FIG. 22. The PCI 1010 is made up of PCI_GI 1102, NSML_AGLI 1103, HLI 1104, and RECI 1105. The PCI_GI 1102 is made up of VOBU_UOP_CTL 1108, VOBU_S_PTM 1109, and VOBU_E_PTM 1110. The VOBU_UOP_CTL 1108 is information indicative of whether or not the manipulation is approved. The VOBU_UOP_PTM 1109 is indicative of the start time of AV data in which the VOBU_UOP_CTL 1108 is valid. The VOBU_E_PTM 1110 is the end time of the AV data validated by the VOBU_UOP_CTL 1108. Note that the other data are irrelevant to the present invention, so that explanation thereof is omitted here.

Further, the private data region 1008 stores the key correlation table 1101. Note that any data can be freely recorded in the private data region 1008. Note also that the recording location of the key correlation table 1101 is not limited to the private data region 1008.

Next, see FIG. 23. The key correlation table 1101 at least includes (i) information indicating the key manipulation input, and (ii) information indicating the name of a program to be executed in response to the specified key manipulation input. Note that the key correlation table 1101 corresponds to information obtained by excluding the scene specifying information 22a and the key control information 22b from the correlation information 22. In other words, the key correlation table 1101 corresponds to information having only the additional function information 22c. See FIG. 2.

Figure 18:
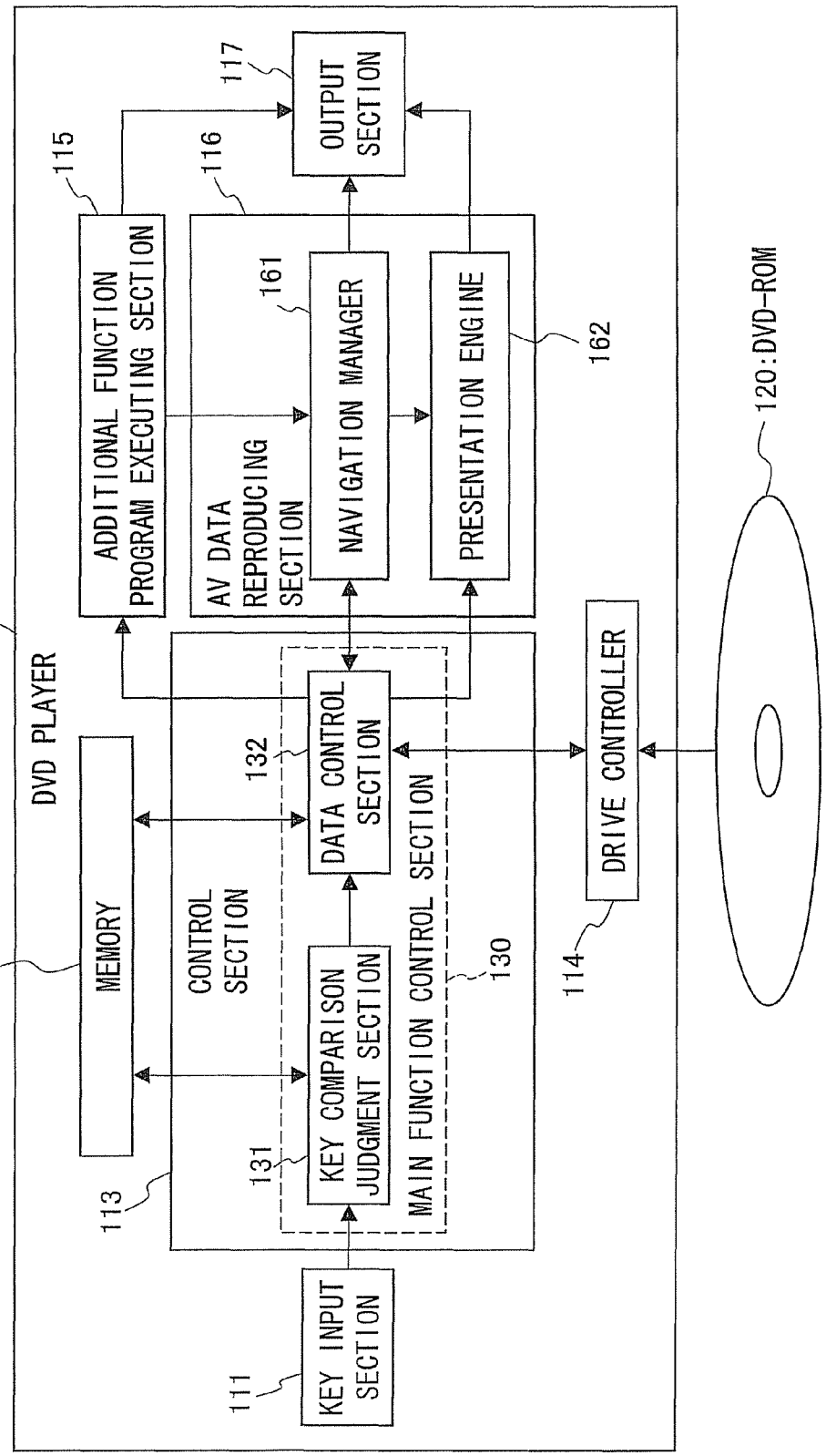
FIG. 18 is a function block diagram schematically illustrating a structure of a DVD player according to one example of the present invention.

The following explains a system structure of the DVD player 110, with reference to FIG. 18. FIG. 18 is a function block diagram schematically illustrating the structure of the DVD player 110.

Here, the DVD player 110 includes: a key input section 111, a memory 112, a control section 113, a drive controller 114, an additional function program executing section 115, an AV data reproducing section 116, and an output section 117, which respectively correspond to the key input section 11, the memory 12, the control section 13, the reading section 14, the additional function program executing section 15, the AV data reproducing section 16, and the output section 17 of the AV data reproducing apparatus 10 shown in FIG. 1. For this reason, the following description only deals with the difference therebetween, for ease of explanation.

The control section 113 is made up of a key comparison judgment section 131 and a data control section 132. Note that the key comparison judgment section 131 and the data control section 132 correspond to one example of a specific structure of the main function control section 31 shown in FIG. 1.

The key comparison judgment section 131 compares (i) instruction information received by the key input section 111, with (ii) the key comparison table 1101 stored in the memory 112. Thereafter, the key comparison judgment section 131 sends information indicative of the key comparison judgment result.

The data control section 132 receives, from the key comparison judgment section 131, the information indicative of the key comparison judgment result. In accordance with the information indicative of the key comparison judgment result, the data control section 132 carries out the following operations (1) through (3): (1) control is carried out such that the additional function program executing section 115 executes the additional function program, in cases where the additional function program needs to be executed; (2) key input information is sent to a navigation manager 710; and (3) information for controlling the AV data is sent to a presentation engine 711 in cases where the AV data control needs to be carried out.

The additional function program executing section 115 receives a program execution instruction from the data controlling section 132, and executes the additional function program stored in the memory 112, and sends an execution result to the output section 117.

The AV data reproducing section 116 receives, from the data control section 132, an instruction of reproducing the VMG 801 and the VTS 803, each of which is stored in the DVD-ROM 1.20. Upon the reception, the AV data reproducing section 116 reproduces the VMG 801 read out from the DVD-ROM 120 by the drive controller 114, and converts the VTS 803 into data compliant with an AV output format. Then, the data thus converted is sent to the output section 117. The AV data reproducing section 116 includes the navigation manger 161 and the presentation engine 162.

The navigation manager 161 receives, from the data control section 132, the VMG 801 serving as the management information of the AV data. The navigation manager 161 interprets (reads) the VMG 801 thus received, and sends, to the presentation engine 162, reproduction control information of the VTS 803 containing the AV data to be reproduced.

From the navigation manager 161, the presentation engine 162 receives the reproduction control information of the VTS 803 containing the AV data to be reproduced. In accordance with the reproduction control information, the presentation engine 162 carries out decoding and reproduction of the AV data contained in the VTS 803. Thereafter, the presentation engine 162 sends the AV data to the output section 117.

The output section 117 overlays (i) the output results which are respectively supplied from the additional function program executing section 115 and the navigation manager 161 and which are made in response to the key input, with (ii) the data which is sent from the presentation engine 162 and which is in compliant with the AV output format. Thereafter, the data thus overlaid is sent to an external AV output apparatus connected to the DVD player 110.

Figure 25:
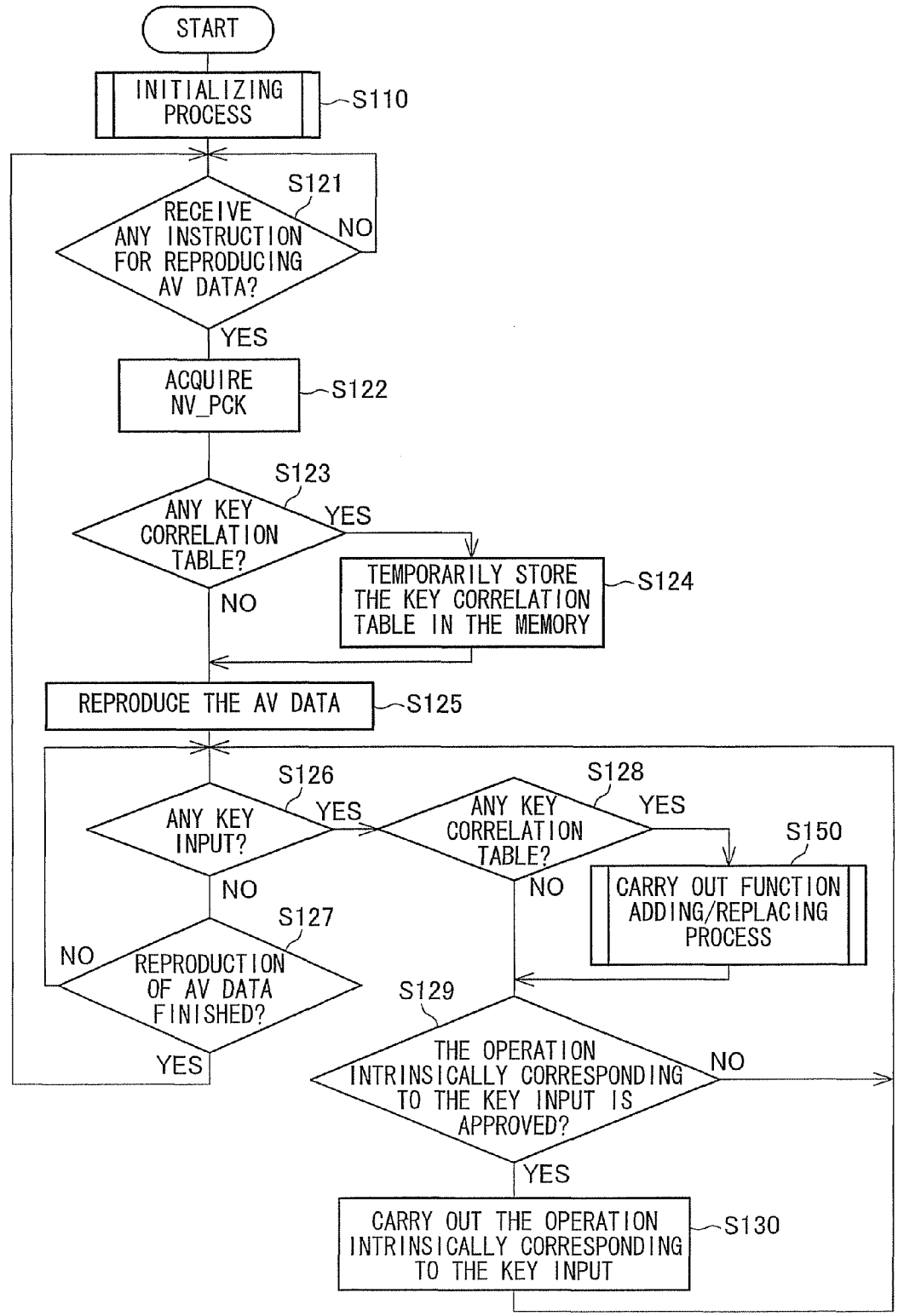
FIG. 25 is a flowchart illustrating procedure of a process carried out while the DVD player shown in FIG. 18 reproduces AV data.

The following explains control carried out while the DVD player 110 reproduces the AV data stored in the DVD-ROM, with reference to FIG. 25. FIG. 25 is a flowchart illustrating the control carried out while the DVD player 110 carries out the reproduction.

Carried out before the start of the reproduction is an initializing process described later (S110). After the initializing process, the title menu of the AV data stored in the DVD-ROM 120 is displayed. Note that a menu display process is irrelevant to the nature of the present invention, so that explanation thereof is omitted here.

Next, the data control section 132 waits until the user selects AV data to be reproduced (NO in Step S121).

When the user uses the key input section 111 to select the AV data to be reproduced (YES in S121), the data control section 132 searches for the VTS 803 containing the AV data thus selected, and instructs the drive controller 114 to read out the VTS 803. The drive controller 114 sends, to the presentation engine 162, the VTSTT_VOB of the VTS 803 thus read out. The presentation engine 162 carries out decoding of the VTSTT_VOB so as to extract the information contained in the NV_PCK 904 (S122).

In cases where the key correlation table 1101 is stored in the NV_PCK 904 (YES in S123), the data control section 132 causes the memory 112 to store the correlation table 1101 (S124). On the other hand, in cases where no key correlation table 1101 is stored in the NV_PCK 904 (NO in S123), the sequence goes to Step S125.

Next, the navigation manager 161 sends, to the presentation engine 162, an instruction of decoding the VTS 803. The presentation engine 162 decodes the A_PCK 905 and the V_PCK 906 in this order, and sends them to the output section 117 (S125). The A_PCK 905 is the audio data, and the V_PCK 906 is the image data.

In cases where the key input section 111 receives no key manipulation input during the reproduction of the AV data (NO in S126), the navigation manager 161 judges whether or not the reproduction of the selected AV data is terminated. In other words, the navigation manager 161 judges whether or not the reproduction of the VTS 803 corresponding to the selected AV data is terminated (S127). In cases where the reproduction of the selected AV data is terminated (YES in S127), the navigation manager 161 waits for manipulation of selecting AV data to be reproduced next.

On the other hand, in cases where the key input section 111 receives the key manipulation input (YES in S126), the navigation manager 161 judges whether or not the key correlation table 1101 is stored in the memory 112 (S128). Carried out in cases where the key correlation table 1101 is stored in the memory 112 (YES in S128) is a later-described process of (i) adding a function different from the function corresponding to the key input, and/or (ii) replacing, with a different function, the function corresponding to the key input (S150). On the other hand, in cases where the key correlation table 1101 is not stored in the memory 112 (NO in S128), the sequence goes to Step S129.

Next, the navigation manager 161 judges whether or not the currently reproduced scene approves (permits) the operation intrinsically corresponding to the key input (S129). The judgment is carried out by judging whether or not the manipulation done by the user is prohibited by the VOBU_UOP_CTL 1108. In cases where the operation intrinsically corresponding to the key input is approved (YES in S129), the navigation manager 161 carries out control over the AV data reproduction carried out by the presentation engine 162 (S130). For example, when the user carries out the manipulation input of suspending reproduction of a scene which approves the manipulation of the pause key, the navigation manager 161 carries out control such that the presentation engine 162 suspends the decoding and the reproduction of the A_PCK 905 and the V_PCK 906. On the other hand, in cases where the operation intrinsically corresponding to the key input is not approved (NO in S129), the navigation manager 161 waits for a key manipulation input.

Figure 24:
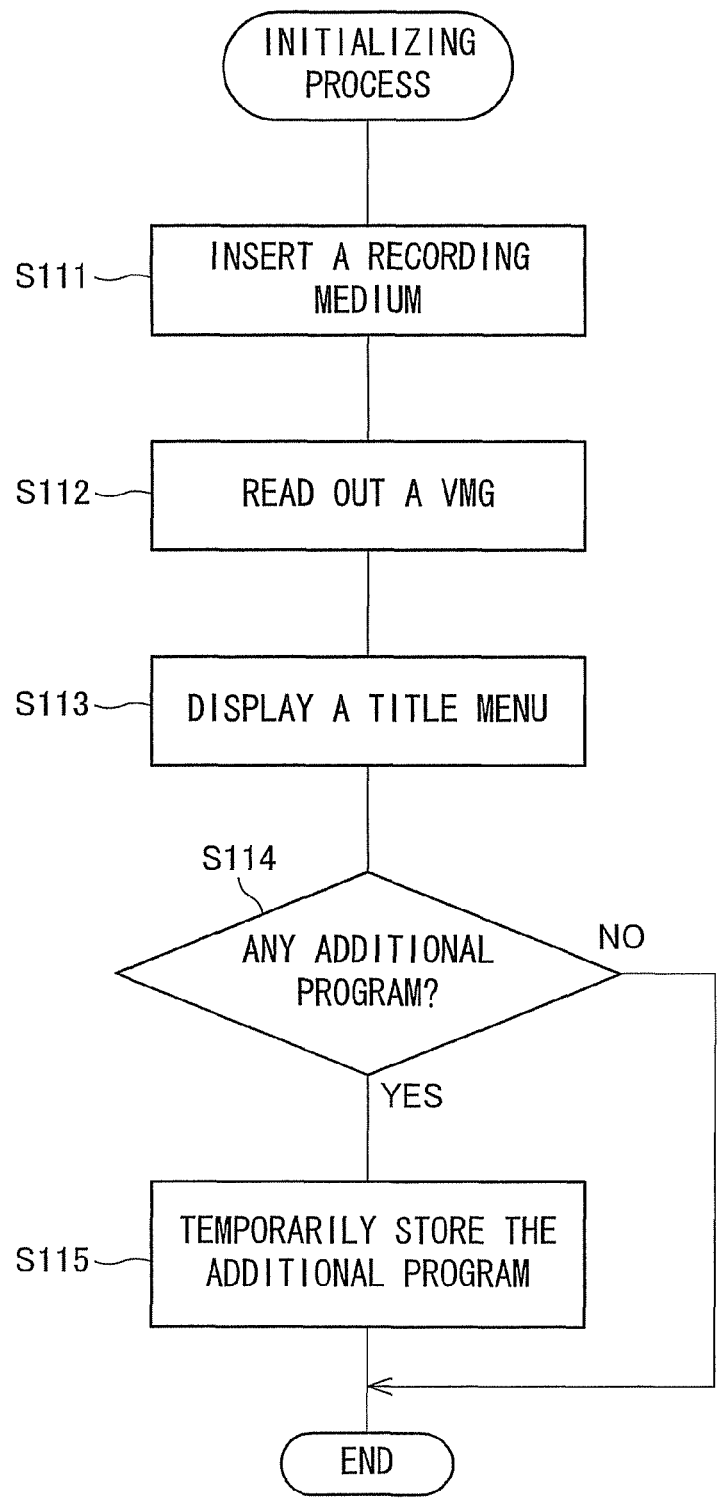
FIG. 24 is a flowchart illustrating procedure of an initializing process of the DVD player shown in FIG. 18.

The following explains the initializing process (S110 in FIG. 25) carried out before the DVD player 110 reproduces the AV data, with reference to FIG. 24. FIG. 24 is a flowchart illustrating the initializing process of the DVD player 110.

When the reproduction of the AV data is triggered, the data control section 132 uses the drive controller 114 to access the DVD-ROM 120 (S111). The data control section 132 reads out the VMG 801 from the DVD-ROM 120, and sends the VMG 801 to the navigation manager 161 of the AV data reproducing section 116 (S112).

Next, the navigation manager 161 interprets (reads) the VMG 801 received from the data control section 132, and sends, to the output section 117, the title menu of the AV data stored in the DVD-ROM 120 (S113).

Next, the data control section 132 checks whether or not the program recording region 802 of the DVD-ROM 120 stores the data of the additional function programs (S114). In cases where the data of the additional function programs is stored in the program recording region 802 (YES in S114), each of the additional function programs is read out and is caused to be stored in the memory 112 (S115). Then, the initializing process is terminated. In FIG. 23, the program recording region 802 stores the CM.class 804, the Animation.1class 805, the Animation2.class 806, and the Animation3.class 807, each of which serves as the data of the additional function program. Therefore, the memory 112 stores these four additional function programs.

On the other hand, in cases where the program recording region 802 stores no data of the additional function programs (NO in S114), the initializing process is terminated.

Note that, in the above example, the display of the title menu is carried out (S113) after the readout (S112) of the VMG 801. Note also that, the judgment (S114) whether or not the program recording region 802 stores the additional function programs may be carried out prior to the readout (S112) of the VMG 801.

Figure 26:
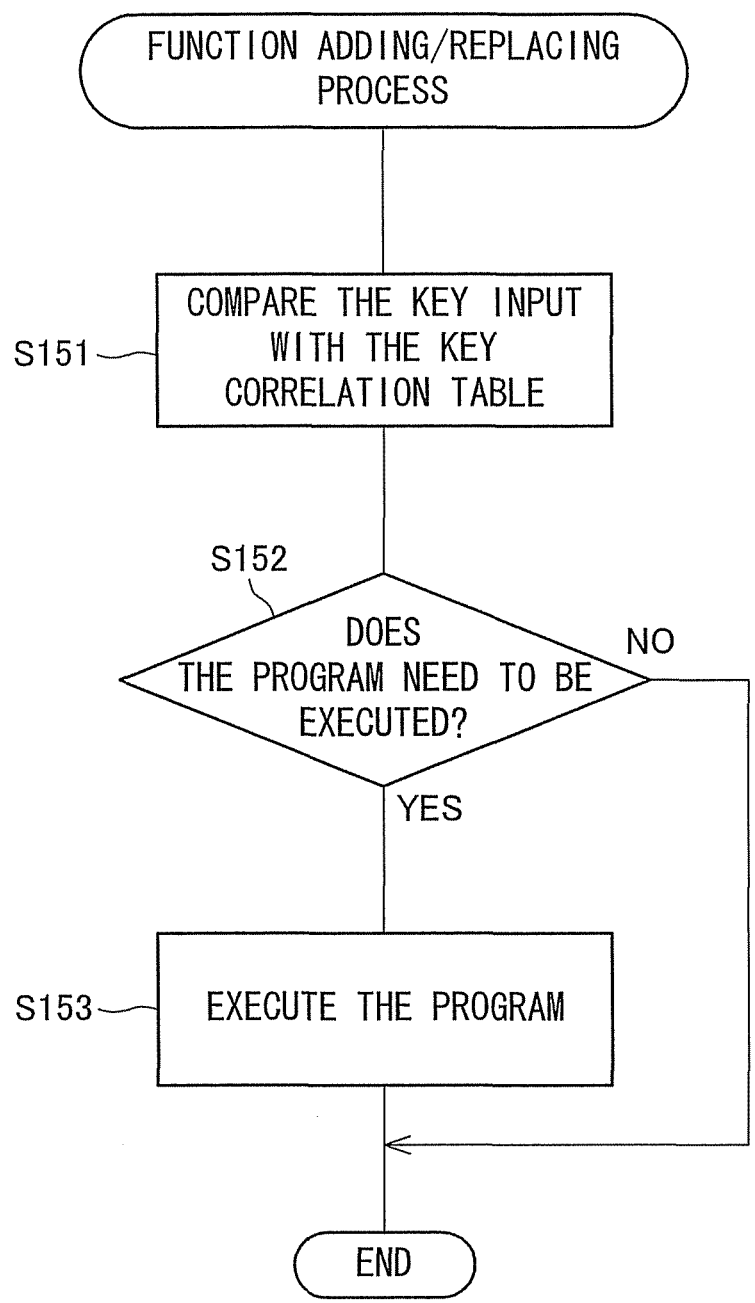
FIG. 26 is a flowchart illustrating procedure of a process carried out while the DVD player shown in FIG. 18 reproduces AV data.

The following explains the process of (i) adding the function different from the function corresponding to the key input, and/or (ii) replacing, with the different function, the function corresponding to the key input. Hereinafter, the process is referred to as "function adding/replacing process". FIG. 26 is a flowchart illustrating the function adding/replacing process.

The DVD player 110 uses each of the additional function programs. This makes it possible to execute (i) the intrinsic function (main function) corresponding to the key input, and (ii) another function. Alternatively, this makes it possible to execute another function instead of the intrinsic function (main function).

Firstly in the function adding/replacing process, the key comparison judgment section 131 searches, in the key correlation table stored in the memory 112, for a key manipulation input corresponding to the key manipulation input (S151). In cases where the additional function program needs to be executed (YES in S152), the program is executed (S153). Then, the function adding/replacing process is terminated.

For example, the key correlation table 1101 shown in FIG. 23 is so set that the additional function program CM.class 804 is executed in response to the manipulation input of the pause key. In cases where the additional function program CM.class 804 is such an additional function program that reproduces commercials (advertisements) at random, the commercials are reproduced at random in response to the manipulation input of the pause key. Further, the key correlation table 1101 is so set that the additional function program Animation1.class 805 is executed in response to the manipulation input of the fast-forward key.

Note that the additional function programs to be executed may be stored in the DVD-ROM 120 as such, or may be stored in the DVD player 110, or may be stored in another recording medium. Further, a combination thereof may be executed.

Meanwhile, in cases where the additional function program does not need to be executed (NO in S152), the process is terminated.

An information reproducing apparatus of the present invention for controlling, in accordance with a manipulation input, reproduction of content data read out from a content recording medium, the information reproducing apparatus may include: (a) additional function information reading means for reading out, from the content recording medium, additional function information indicating an additional function correlated with the manipulation input; and (b) additional function executing means for executing the additional function in response to the manipulation input.

A method of the present invention for controlling, in accordance with a manipulation input, reproduction of content data read out from a content recording medium, the method may include the steps of: (a) reading out, from the content recording medium, additional function information indicating an additional function correlated with the manipulation input; and (b) executing the additional function in response to the manipulation input.

The structure and the method allow the following effect. That is, the additional function information indicating the additional function correlated with the manipulation input is read out from the content recording medium, so that the additional function can be carried out in response to the manipulation input specified by the additional function information.

This makes it possible to execute the function different from the function intrinsically corresponding to the manipulation input. Further, the additional function information for specifying the additional function can be supplied together with the content data. Note that the information indicating the additional function may be stored in advance in the information reproducing apparatus, or may be read out by the information reproducing apparatus from either another recording medium or an external apparatus as required. A specific example of the information indicating the additional function is an additional function program.

This makes it possible that the control unique to the content is flexibly carried out in response to the manipulation input. Further, the content data and the additional function information can be supplied from the same content recording medium, so that data handling and medium handling are easy.

The information reproducing apparatus of the present invention may further include: additional function program reading means for reading out, from the content recording medium, an additional function program which indicates the additional function and which is stored in the content recording medium together with the content data.

The structure above makes it possible that an arbitrary process is carried out in response to the manipulation input as the additional function correlated with the manipulation input by the additional function information. Further, the additional function program for indicating the additional function, the content data, and the additional function information can be supplied from the same content recording medium, so that data handling and medium handling are easy.

The information reproducing apparatus of the present invention may further include: image information reading means for reading out, from the content recording medium, image information which indicates the additional function and which is stored in the content recording medium together with the content data; wherein: the additional function executing means displays the image information in response to the manipulation input.

The structure above makes it possible that: in response to the manipulation input, the display of the image information is carried out as the additional function correlated with the manipulation input by the additional function information. Further, the image information for indicating the additional function, the content data and the additional function information can be supplied from the same content recording medium, so that data handling and medium handling are easy.

Further, the information reproducing apparatus of the present invention may further include: text information reading means for reading out, from the content recording medium, text information which indicates the additional function and which is stored in the content recording medium together with the content data; wherein: the additional function executing means displays the text information in response to the manipulation input.

The structure above makes it possible that: in response to the manipulation input, the display of the text information is carried out as the additional function correlated with the manipulation input by the additional function information. Further, the audio information for indicating the additional function, the content data, and the additional function information can be supplied from the same content recording medium, so that data handling and medium handling are easy.

The information reproducing apparatus of the present invention may further include: audio information reading means for reading out, from the content recording medium, audio information which indicates the additional function and which is stored in the content recording medium together with the content data; wherein: the additional function executing means reproduces the audio information in response to the manipulation input.

The structure above makes it possible that: in response to the manipulation input, the output of the audio information is carried out as the additional function correlated with the manipulation input by the additional function information. Further, the content data and the additional function information can be supplied from the same content recording medium, so that data handling and medium handling are easy.

The information reproducing apparatus of the present invention may be arranged such that the additional function information includes a flag indicating whether or not sound of the content data is muted while the audio information is reproduced.

The structure above makes it possible to select whether (i) the sound of the AV data and the audio information of the additional function are outputted simultaneously, or (ii) only the audio information of the additional function is outputted.

The information reproducing apparatus of the present invention may be arranged such that the additional function information is so set as to correspond to each scene of the content data.

The structure makes it possible that the additional function can be executed in each scene. Accordingly, the same manipulation input done in different scenes can cause execution of different additional functions.

The information reproducing apparatus of the present invention may further include: (i) main function control information reading means for reading out, from the content recording medium, main function control information indicating whether or not execution of a main function is approved, which main function is a function intrinsically corresponding to the manipulation input; and (ii) main function control means for controlling, in accordance with the main function control information, the execution of the main function, which execution is carried out in response to the manipulation input.

The structure above makes it possible to control, in accordance with the main function control information, whether or not the execution of the main function corresponding to the manipulation input is approved. This makes it possible not only (i) to control whether or not the function intrinsically corresponding to the manipulation input is to be executed, but also (ii) to execute the function different from the intrinsic function as the additional function. Further, the main function control information and the content data can be supplied together.

This makes it possible that the control unique to the content is flexibly carried out in response to the manipulation input. Further, the content data, the additional function information, and the main function control information can be supplied from the same content recording medium, so that data handling and medium handling are easy.

Further, the information reproducing apparatus of the present invention may be arranged such that the main function control information is so set as to correspond to each scene of the content data.

The structure above makes it possible that the control over the function intrinsically corresponding to the manipulation input is carried out in each scene. Accordingly, the same manipulation input done in different scenes can cause execution of different controls.

The information reproducing apparatus of the present invention may be arranged such that a function for notifying information concerning disapproval of execution of the main function is assigned, as an additional function, to the manipulation input corresponding to the main function whose execution is disapproved by the main function control information.

The information reproducing apparatus may be arranged such that a function for notifying information representing that the manipulation input is prohibited is assigned, as an additional function, to the manipulation input corresponding to the main function whose execution is disapproved by the main function control information.

The structure above makes it possible that: instead of the indication using the mere warning sound and/or the warning display, the indication using the way suitable for the currently reproduced content data is carried out in response to the manipulation input which is prohibited in the scene.

Accordingly, the user's unpleasant feeling is reduced even when the user receives the warning made in response to the manipulation done in the scene prohibiting the manipulation. This is because the warning does not uses the mere warning sound and warning display.

The information reproducing apparatus of the present invention may be arranged such that a function for notifying information representing an approved manipulation input is assigned, as an additional function, to the manipulation input corresponding to the main function whose execution is disapproved by the main function control information.

The structure above makes it possible to indicate, in response to the inoperable manipulation input, the information representing the operable manipulation input. With this, the operable manipulation input can be notified to even a child or the like.

The information reproducing apparatus of the present invention may be arranged such that: the manipulation input corresponds to either (i) manipulation of suspending the reproduction of the content data or (ii) manipulation of halting the reproduction of the content data, and a function for notifying information different from the content data that is being reproduced is assigned, as an additional function, to the manipulation input.

The structure above makes it possible that the information different from the content data is indicated in response to the pausing manipulation or the halting manipulation. A specific example of such information is advertisement (commercial; CM).

The information reproducing apparatus of the present invention may be arranged such that: the manipulation input corresponds to manipulation of changing either (i) a reproduction direction of the content data or (ii) reproduction speed of the content data, and a function for notifying information different from the content data that is being reproduced is assigned, as an additional function, to the manipulation input.

The structure above makes it possible that the information different from the content data is displayed in response to the manipulation of changing either the reproduction direction or the reproduction speed. A specific example of such information is animation corresponding to either the reproduction direction or the reproduction speed. With this, the user can visually enjoy even when carrying out the manipulation of controlling the reproduction.

The information reproducing apparatus of the present invention may be arranged such that: the manipulation input corresponds to manipulation of carrying out fast-forward of the content data, and a function for notifying information different from the content data that is being reproduced is assigned, as an additional function, to the manipulation input.

The structure above makes it possible that the information different from the content data is displayed in response to the fast-forwarding manipulation. A specific example of such information is animation indicating a reproduction position. With this, the user can visually enjoy even when carrying out the manipulation of controlling the reproduction.

The information reproducing apparatus of the present invention may be arranged such that: the manipulation input corresponds to manipulation of carrying out fast-forwarding of the content data, and a function for (i) carrying out the fast-forwarding of the content data until a predetermined position and (ii) reproducing the content data at normal speed from the predetermined position is assigned, as an additional function, to the manipulation input.

The structure above makes it possible to set the position at which the reproduction speed changed to fast-forwarding speed in response to the fast-forwarding manipulation is changed again to the normal reproduction speed. For example, in cases where the content data have a scene to be viewed surely, the content preparer sets the start position of the scene as the predetermined position in advance. With this, even when the fast-forwarding is carried out in response to the fast-forwarding manipulation, the fast-forwarding continues until the scene comes. In the scene, the reproduction speed is caused to be changed to the normal reproduction speed, with the result that the user is caused to view the scene.

The information reproducing apparatus may be arranged such that a function different from the function intrinsically corresponding to the manipulation input is assigned, as an additional function, to the manipulation input.

The structure above makes it possible that the function different from the function intrinsically corresponding to the manipulation input is executed in response to the manipulation carried out with respect to the information reproducing apparatus.

The information reproducing apparatus may be arranged such that: the manipulation input corresponds to reproduction manipulation carried out during the reproduction of the content data, and a function different from a reproduction function is assigned, as an additional function, to the manipulation input.

The structure above makes it possible that the function different from the function for reproducing the content data is executed in response to the reproduction manipulation carried out during the reproduction of the content data. For example, by pressing such a reproduction key when viewing the movie having a subtitle, characters or letters in the subtitle become large and/or are turned into Hiragana characters (or different expression, or different translation). This is good for a user who feels that characters or letters in the subtitle are too complicated to be legible.

The information reproducing apparatus of the present invention may be arranged such that: the additional function is a function for notifying the information such that the information is overlaid with the content data that is being reproduced.

The structure above makes it possible that the information to be indicated by way of the additional function is indicated together with the content data that is being reproduced.

The information reproducing apparatus of the present invention may be arranged such that: the content recording medium stores data having a data structure in which the content data is sectioned based on a unit time and in which the additional function information is able to be recorded based on the unit time.

The structure above makes it possible that the content data and the additional function information are so stored as to correspond to each other. Further, no scene specifying information for specifying a scene needs to be prepared additionally.

Note that, in the DVD standard, the content data is sectioned based on the unit time, and the additional function information can be recorded based on the unit time, and the main function control information can be recorded based on the unit time. Therefore, in cases where the content data is stored in compliance with the DVD standard, the content data, the main function control information, and the additional function information can be so stored as to correspond to one another. Of course, no scene specifying information for specifying a scene needs to be prepared additionally. For this reason, the information reproducing apparatus is suitable for the content recording medium in which the content data is stored in compliance with the DVD standard.

A content recording medium of the present invention may store the content data and the additional function information such that the content data and the additional function information is able to be supplied to the information reproducing apparatus.

The structure above makes it possible to supply the content data together with the additional function information for carrying out control unique to the content in response to the manipulation input. Note that it is preferable that the additional function program specified by the additional function information be stored in the content recording medium storing the content data and the additional function information.

A control program of the present invention is a program for causing a computer to serve as each means of the information reproducing apparatus.

The structure above makes it possible to realize, on the computer, the means of the information reproducing apparatus. Accordingly, the information reproducing apparatus is realized.

A computer-readable recording medium of the present invention is a computer-readable recording medium storing the control program for realizing the means on the computer so as to operate the information reproducing apparatus.

The structure above makes it possible that the information reproducing apparatus can be realized on the computer by using the control program read out from the recording medium.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The information reproducing apparatus (AV data reproducing apparatus) according to the present invention is capable of executing a function different from the function intrinsically corresponding to a manipulation input. This makes it possible to flexibly carry out control unique to a content in response to the manipulation input. For this reason, the present invention is widely applicable to a player for reproducing AV data from a recording medium such as a DVD medium or the like.

The invention claimed is:

1. An AV data reproducing apparatus, comprising:
an AV data reproducing section configured to reproduce AV data stored in a recording medium;
an input section configured to acquire a manipulation input to which a main function of the AV data reproducing section is assigned; and
a program executing section configured to execute an additional functional program stored in the recording medium, the additional functional program, when executed, (a) displaying a message to a user and (b) not blocking or inhibiting the main function relating to handling of the AV data,
wherein
the recording medium stores key control information indicating whether execution of the main function assigned to the manipulation input is approved or not and the additional functional program in such a manner that the key control information and the additional functional program are correlated with each other, and
said AV data reproducing apparatus further comprises:
a control section configured to, in a case where the key control information stored in the recording medium indicates that execution of the main function assigned to the manipulation input is approved, instruct the AV data reproducing section to execute the main function assigned to the manipulation input, and when the additional functional program stored in the recording medium is correlated with the key control information, instruct the program executing section to execute the additional functional program, and in a case where the key control information stored in the recording medium indicates that execution of the main function assigned to the manipulation input is not approved, (i) not cause the AV data reproducing section to execute the main function assigned to the manipulation input and, when the additional functional program stored in the recording medium is correlated with the key control information, (ii) instruct the program executing section to execute only the additional functional program.

2. A recording medium, used for an AV reproducing apparatus as set forth in claim 1, wherein
the recording medium stores the AV data, the program and correlation information in which the key control information is correlated with the program, in order to allow the AV reproducing apparatus to carry out reproduction.

3. An method for controlling an AV data reproducing apparatus, the AV data reproducing apparatus including:
an AV data reproducing section configured to reproduce AV data stored in a recording medium;
an input section configured to acquire a manipulation input to which a main function of the AV data reproducing section is assigned; and
a program executing section configured to execute an additional functional program stored in the recording medium, the additional functional program, when executed, (a) displaying a message to a user and (b) not blocking or inhibiting the main function relating to handling of the AV data,
wherein
the recording medium stores key control information indicating whether execution of the main function assigned to the manipulation input is approved or not and the additional functional program in such a manner that the key control information and the additional functional program are correlated with each other, and
said method comprises the step of, in a case where the key control information stored in the recording medium indicates that execution of the main function assigned to the manipulation input is approved, instructing the AV data reproducing section to execute the main function assigned to the manipulation input, and when the additional functional program stored in the recording medium is correlated with the key control information, instructing the program executing section to execute the additional functional program, and in a case where the key control information stored in the recording medium indicates that execution of the main function assigned to the manipulation input is not approved,
(i) not causing the AV data reproducing section to execute the main function assigned to the manipulation input and, when the additional functional program stored in the recording medium is correlated with the key control information, (ii) instructing the program executing section to execute only the additional functional program.

* * * * *